(12) United States Patent
Hayashi

(10) Patent No.: US 11,087,526 B2
(45) Date of Patent: Aug. 10, 2021

(54) IMAGE PROCESSING PROGRAM, IMAGE PROCESSING APPARATUS, AND IMAGE PROCESSING METHOD

(71) Applicant: SQUARE ENIX CO., LTD., Tokyo (JP)

(72) Inventor: Masato Hayashi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/941,314

(22) Filed: Jul. 28, 2020

(65) Prior Publication Data
US 2021/0035351 A1 Feb. 4, 2021

(30) Foreign Application Priority Data

Jul. 29, 2019 (JP) .............................. JP2019-138813

(51) Int. Cl.
*G06T 15/20* (2011.01)
(52) U.S. Cl.
CPC .................................... *G06T 15/20* (2013.01)
(58) Field of Classification Search
None
See application file for complete search history.

(56) References Cited

U.S. PATENT DOCUMENTS

| | | | | |
|---|---|---|---|---|
| 2005/0117215 | A1* | 6/2005 | Lange ..................... | G03B 35/00 359/462 |
| 2012/0056992 | A1* | 3/2012 | Kuroda ................ | H04N 13/156 348/46 |
| 2016/0163063 | A1 | 6/2016 | Ashman | |
| 2021/0029386 | A1* | 1/2021 | Hamada ............. | H04N 21/4394 |

FOREIGN PATENT DOCUMENTS

| | | |
|---|---|---|
| JP | 2011118687 A | 6/2011 |
| JP | 2011198138 A | 10/2011 |
| JP | 2018503165 A | 2/2018 |

OTHER PUBLICATIONS

Reasons for Refusal of JP Application No. P2019-138813 dated Sep. 29, 2020.

\* cited by examiner

*Primary Examiner* — Frank S Chen
(74) *Attorney, Agent, or Firm* — Dorsey & Whitney LLP

(57) ABSTRACT

A non-transitory computer-readable medium including an image processing program is provided. The image processing program causes a terminal device to: obtain a photographed image obtained by photographing a real space; display a display frame having one or more display areas in a display area of the photographed image in a case where a predetermined condition is satisfied; obtain virtual space information at least containing three-dimensional virtual object information and positional relationship information, the three-dimensional virtual object information regarding one or more three-dimensional virtual objects arranged in a virtual space in advance; and render a certain three-dimensional virtual object viewed behind the display area when the display frame is photographed from the virtual viewpoint in a case where the display frame in the virtual space is virtually photographed from a virtual viewpoint, and display the certain three-dimensional virtual object in the display area of the display frame.

7 Claims, 18 Drawing Sheets

Fig. 18
(a)
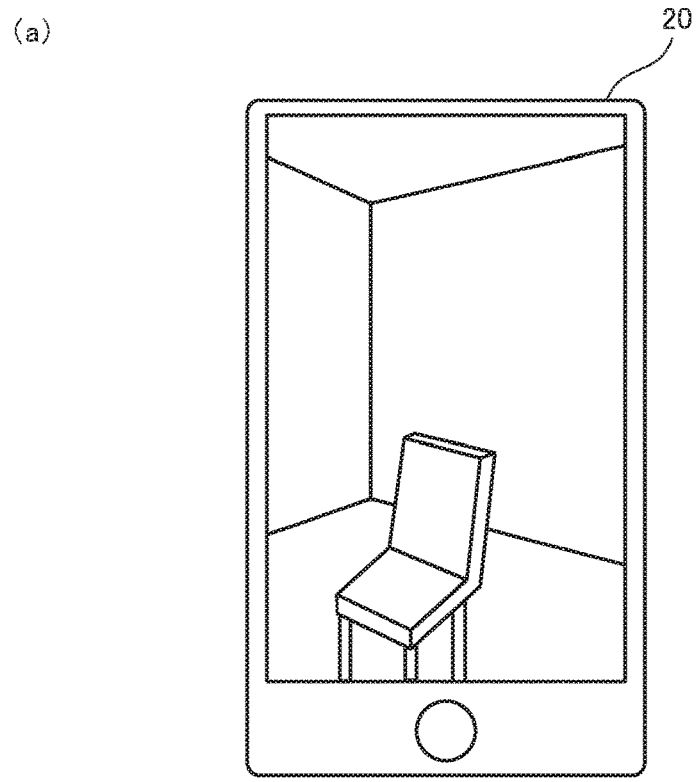
(b)
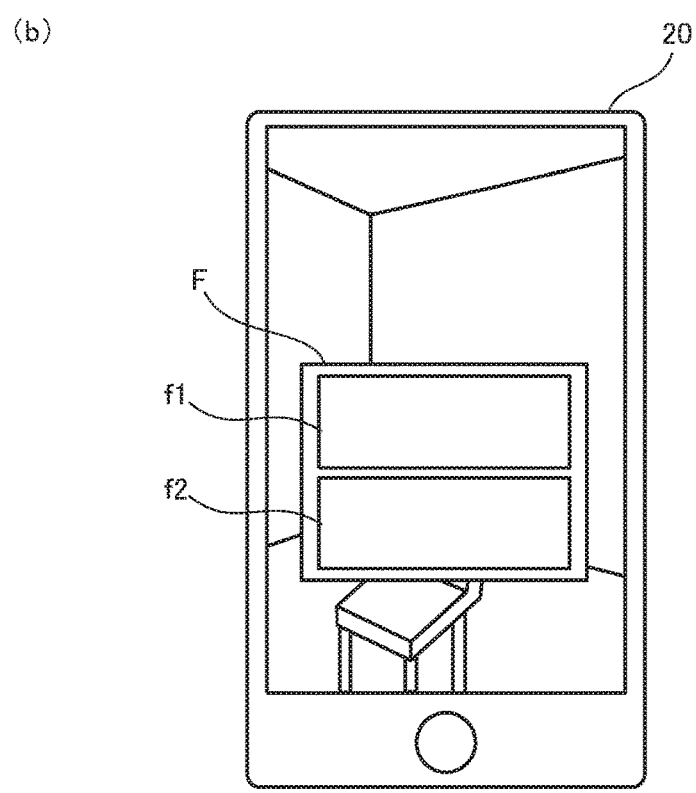

IMAGE PROCESSING PROGRAM, IMAGE PROCESSING APPARATUS, AND IMAGE PROCESSING METHOD

CROSS-REFERENCE TO RELATED APPLICATION

The present application claims priority to Japanese Patent Application No. 2019-138813 filed on Jul. 29, 2019, the disclosure of which is expressly incorporated herein by reference in its entirety.

BACKGROUND OF THE INVENTION

1. Field of the Invention

At least one of embodiments of the present invention relates to an image processing program, an image processing apparatus, and an image processing method capable of converting a three-dimensional virtual object with a complicated configuration into a two-dimensional display image and displaying the converted two-dimensional display image while a processing load is reduced.

2. Description of the Related Art

In recent years, a case where a two-dimensional display image is generated and utilized by using a three-dimensional virtual object often occurs. For example, an example in which an image obtained by photographing a situation where a three-dimensional virtual object is arranged in a virtual space by means of a virtual camera from a specific viewpoint is obtained as a two-dimensional display image and utilized in any of comics or animations has already existed. Further, a two-dimensional display image generated by using a three-dimensional virtual object is also being superimposed and displayed onto a photographed image obtained by photographing a real space using an Augmented Reality technique (AR technique).

For example, JP2011-198138A (hereinafter, referred to as "Patent Document 1") discloses that an image obtained by photographing, by a virtual camera, a situation that a three-dimensional virtual object is arranged in a virtual space from a specific viewpoint is obtained as a two-dimensional display image and the image is utilized for creation of comics. This Patent Document 1 discloses a comics creation supporting apparatus that supports creation of comics containing frames. The comics creation supporting apparatus includes: a function to determine whether a head of an object is included in a photographed image when an image obtained by photographing, from a specific viewpoint by a virtual camera, a situation that a character as a three-dimensional virtual object is arranged in a virtual space is adopted for a frame of comics as a two-dimensional still image; and a function to present only the image in which the head of the object is included as candidates of a frame image.

SUMMARY

The Patent Document 1 described above discloses that images obtained by photographing the character arranged in the virtual space as the three-dimensional virtual object from a plurality of viewpoint directions are respectively adopted for frames of the comics as still images. However, the Patent Document 1 does not disclose a configuration in which an image obtained by always rendering a virtual space is adopted for the frame. It may also be configured so that a rendering process is always executed for each of the images from the plurality of viewpoint directions and the images are respectively displayed in the frames. However, there has been a problem that this process to always render and display virtual spaces from the plurality of viewpoint directions in this manner becomes a very heavy processing load.

In order to reduce the processing load, the processing load can be reduced by reducing the number of viewpoint directions of the images rendered at the same time, for example, selecting only one viewpoint direction. However, a problem that if the number of viewpoint directions is simply reduced, an image to be displayed becomes monotonous and this causes lack of fun thereof may occur.

It is an object of at least one of embodiments of the present invention to solve the problems described above, and provide an image processing program, an image processing apparatus, and an image processing method capable of converting a three-dimensional virtual object with a complicated configuration into a two-dimensional display image and displaying the converted two-dimensional display image while a processing load is reduced.

According to one non-limiting aspect of the present invention, there is provided a non-transitory computer-readable medium including an image processing program for causing a terminal device provided with a photographing unit and a display unit to perform functions to cause the display unit to display a display screen. In this case, the display screen is obtained by superimposing and displaying a virtual object onto a photographed image. The virtual object is arranged in a virtual space. The photographed image is obtained by photographing a real space by means of the photographing unit.

The functions include a photographed image obtaining function configured to obtain a photographed image, the photographed image being obtained by photographing a real space by means of the photographing unit.

The functions also include a display frame displaying function configured to display a display frame in a display area of the photographed image in a case where a predetermined condition is satisfied, the display frame being one of virtual objects and having one or more display areas.

The functions also include a virtual space information obtaining function configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame.

The functions also include a rendering function configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering function being configured to display the certain three-dimensional virtual object in the display area of the display frame.

According to another non-limiting aspect of the present invention, there is provided an image processing apparatus provided with a photographing unit and a display unit.

The image processing apparatus includes a photographed image obtaining unit configured to obtain a photographed image, the photographed image being obtained by photographing a real space by means of the photographing unit.

The image processing apparatus also includes a display frame displaying unit configured to display a display frame in a display area of the photographed image in a case where a predetermined condition is satisfied, the display frame being one of virtual objects and having one or more display areas.

The image processing apparatus also includes a virtual space information obtaining unit configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame.

The image processing apparatus also includes a rendering unit configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering unit being configured to display the certain three-dimensional virtual object in the display area of the display frame.

According to still another non-limiting aspect of the present invention, there is provided an image processing method of causing a terminal device provided with a photographing unit and a display unit to display a display screen by the display unit. In this case, the display screen is obtained by superimposing and displaying a virtual object onto a photographed image. The virtual object is arranged in a virtual space. The photographed image is obtained by photographing a real space by means of the photographing unit.

The image processing method includes a photographed image obtaining process configured to obtain a photographed image, the photographed image being obtained by photographing a real space by means of the photographing unit.

The image processing method also includes a display frame displaying process configured to display a display frame in a display area of the photographed image in a case where a predetermined condition is satisfied, the display frame being one of virtual objects and having one or more display areas.

The image processing method also includes a virtual space information obtaining process configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame.

The image processing method also includes a rendering process configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering process being configured to display the certain three-dimensional virtual object in the display area of the display frame.

According to each of the embodiments of the present application, one or two or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings:

FIG. 18 is an explanatory drawing illustrating one example of a display screen that a terminal device is caused to display corresponding to at least one of the embodiments of the present invention.

DETAILED DESCRIPTION OF THE INVENTION

Hereinafter, examples of embodiments according to the present invention will be described with reference to the drawings. Note that various components in the respective embodiments described below can be appropriately, combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
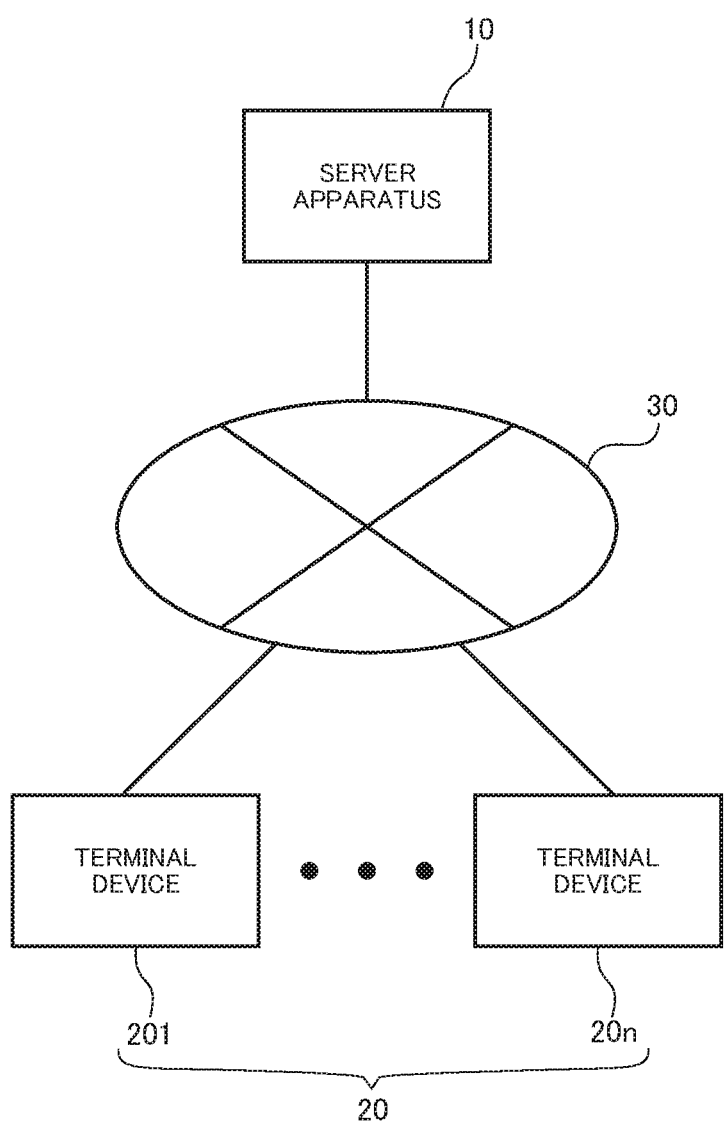
FIG. 1 is a block diagram illustrating an example of a system configuration necessary for an image processing apparatus corresponding to at least one of the embodiments of the present invention.

FIG. 1 is a block diagram illustrating an example of a system configuration required for an image processing apparatus corresponding to at least one of embodiments according to the present invention. As illustrated in FIG. 1, a whole system according to the present embodiment is configured so as to include a server apparatus 10 and terminal devices 20, and 201 to 20n ("n" is an arbitrary integer more than one), which are respectively utilized by users. FIG. 1 illustrates both the server apparatus 10 and the terminal devices 20, and 201 to 20n. However, in the present embodiment, both a case where the terminal device 20 serves as an image processing apparatus by a single body and a case where the server apparatus 10 and the terminal device 20 share and perform various kinds of functions, and as a result, they serves as the image processing apparatus as a whole (in this case, it can be said to be an image processing system that includes multiple configurations) are assumed. In this regard, even in a case where both the server apparatus 10 and the terminal device 20 serve as the image processing apparatus, a subject used by the user is the terminal device 20. Thus, hereinafter, the terminal device 20 may be expressed as an "image processing apparatus 20" by using the reference numeral "20" as an example of a case where the terminal device 20 executes processes as a subject of the image processing apparatus. In this regard, a system configuration thereof is not limited to this. For example, the image processing apparatus 20 may be configured so that a plurality of users utilizes a single terminal device, or may be configured so as to include a plurality of server apparatuses.

Each of the server apparatus 10 and the plurality of terminal devices 20, and 201 to 20n is connected to a communication network 30 such as the Internet. In this regard, although it is not illustrated in the drawings, the plurality of terminal devices 20, and 201 to 20n is connected to the communication network 30 by executing data communication with base stations managed by a telecommunication carrier by means of a radio communication line. The system includes the server apparatus 10 and the plurality of terminal devices 20, and 201 to 20n, thereby realizing various kinds of functions for executing various kinds of processes in response to an operation of the user.

The server apparatus 10 is managed by an administrator of the system, and has various kinds of function to provide information regarding the various kinds of processes to each of the plurality of terminal devices 20, and 201 to 20n. In the present embodiment, the server apparatus 10 is constructed by an information processing apparatus, such as a WWW server, and includes a storage medium for storing various kinds of information. In this regard, the server apparatus 10 is provided with a general configuration to execute various kinds of processes, such as a control unit or a communicating unit, as a computer. However, its explanation herein is omitted. Further, it is preferable that the server apparatus 10 manages various kinds of information from a point of view to reduce a processing load on each of the plurality of terminal devices 20, and 201 to 20n. However, a storing unit configured to store the various kinds of information may be provided with a storage region in a state where the server apparatus 10 can access the storage region. For example, the server apparatus 10 may be configured so as to include a dedicated storage region outside the server apparatus 10.

Each of the plurality of terminal devices 20, and 201 to 20n is managed by the users, and is configured by a communication terminal such as a cellular telephone terminal, a PDA (Personal Digital Assistants), or a portable game apparatus, for example. Further, in the present embodiment, each of the terminal devices 20, and 201 to 20n includes a photographing unit and a display unit. The photographing unit corresponds to a camera device or the like, for example. However, the photographing unit may be any one so long as it can photograph a situation around the user as a moving image or a still image. The display unit corresponds to a display device, for example. However, the display unit may be any one so long as it can display the moving image or the still image photographed by the photographing unit.

Further, each of the plurality of terminal devices 20, and 201 to 20n is connected to the communication network 30, and includes hardware and software for executing various kinds of processes by communicating with the server apparatus 10. In this regard, each of the plurality of terminal devices 20, and 201 to 20n may be configured so as to be able to directly communicate with each other without the server apparatus 10.

During the various kinds of processes by the image processing apparatus, the server apparatus 10 appropriately transmits a process stage to each of the plurality of terminal devices 20, and 201 to 20n if necessary. Each of the plurality of terminal devices 20, and 201 to 20n causes the display unit to display a display image containing the content of the received process stage. Generation of the display image (or generation of a part of the display image) may be executed by the server apparatus 10, or may be executed by the terminal device 20.

Figure 2:
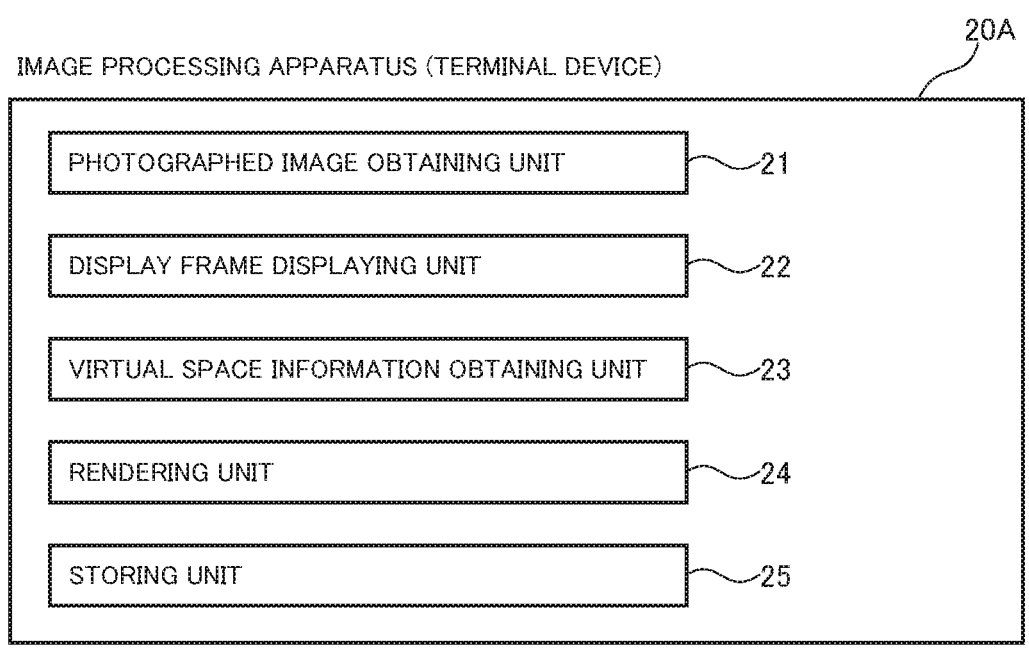
FIG. 2 is a block diagram illustrating a configuration of the image processing apparatus corresponding to at least one of the embodiments of the present invention.

FIG. 2 is a block diagram illustrating a configuration of the image processing apparatus corresponding to at least one of the embodiments of the present invention. As illustrated in FIG. 2, an image processing apparatus 20A at least includes a photographed image obtaining unit 21, a display frame displaying unit 22, a virtual space information obtaining unit 23, a rendering unit 24, and a storing unit 25. In examples illustrated in FIGS. 3 to 5, the image processing apparatus 20A that executes image processing (will be described later) may be configured by at least one of the server apparatus 10 or the terminal device 20. Hereinafter, the image processing apparatus 20A may also be referred to as a "terminal device 20A".

The photographed image obtaining unit 21 has a function to obtain a photographed image obtained by photographing a real space by the photographing unit. For example, the photographed image obtaining unit 21 obtains a situation around the user as a photographed image of a still image or a moving image by the camera device of the terminal device 20, such as a smartphone possessed by the user.

The display frame displaying unit 22 has a function to display a display frame in a display area of the photographed image in a case where a predetermined condition is satisfied. The display frame is one of virtual objects, and has one or more display areas. Here, the virtual object means a virtual object that is to be arranged in a virtual space. Further, the three-dimensional virtual object means a virtual object that is expressed by a three-dimensional structure. As an example of the three-dimensional virtual object, there is an object that is expressed by a three-dimensional structure of polygons, for example. In this regard, it is not necessary that the object arranged in the virtual space is a three-dimensional virtual object. The object arranged in the virtual space may be an object with a planar shape obtained by drawing a 2D animation. Namely, in the present embodiment, in a case where an object is expressed as a three-dimensional virtual object, the object includes a two-dimensional virtual object arranged in a three-dimensional virtual space. Further, the display frame is one of the virtual objects, and is a virtual object for realizing a function to display the virtual object arranged in the virtual space to the user. Further, the display area means an area that has a function to display a virtual object arranged in a virtual space to a user. The number of display areas to be provided in a display frame can be set appropriately. The display frame is configured by one or more display areas and a frame portion other than the display areas, for example.

Further, the predetermined condition is a condition for starting to display the display frame. The present embodiment relates to so-called Augmented Reality (AR) in which a display frame that is a virtual object is superimposed and displayed onto a photographed image obtained by photographing a real space. Therefore, it is necessary to set in advance what condition for the photographed image of the real space is satisfied for superimposing and displaying the display frame. The predetermined condition may be any condition. However, for example, the following conditions are thought. Namely, the conditions includes a condition triggered by a situation that a position indicated by positional information such as GPS information of the terminal device 20 reaches a predetermined position, a condition triggered by a case where the terminal device 20 specifies a predetermined object (an AR marker, a bar code, a matrix type two-dimensional code, a unique object, or the like), which exists in a real space, from a photographed image, and a condition triggered by a case where the terminal device 20 receives a predetermined radio signal from a near field communication device such as a beacon.

The virtual space information obtaining unit 23 has a function to obtain virtual space information. The virtual space information at least contains three-dimensional virtual object information regarding one or more three-dimensional virtual objects and positional relationship information between each of the three-dimensional virtual objects and the display frame. The one or more three-dimensional virtual objects are arranged in the virtual space in advance. The three-dimensional virtual object information means information required to specify a three-dimensional virtual object. For example, in a case where a three-dimensional virtual object is formed by a 3D polygon, texture information on a surface of each face is contained as the three-dimensional virtual object information in addition to apexes of the 3D polygon and information for specifying how faces of a polygon is configured. Further, in the present embodiment, the positional relationship information means information for specifying a positional relationship between a display frame definitely arranged in a virtual space and a three-dimensional virtual object arranged in the virtual space. In this regard, the content of the positional relationship between the display frame and the three-dimensional virtual object is not limited particularly. However, in order for the rendering unit 24 (will be described later) to render the three-dimensional object in the display area of the display frame, the positional relationship that becomes a rendering target when the display frame is photographed from a virtual viewpoint is required. The virtual space information at least containing the three-dimensional virtual object information and the positional relationship information is obtained by the virtual space information obtaining unit 23. This virtual space information may be configured so as to be stored in the storing unit 25 of the terminal device 20, or may be configured so that the virtual space information is stored in the storing unit of the server apparatus 10 and the terminal device 20 obtains the virtual space information from the server apparatus 10 via the communication network 30.

The rendering unit 24 has a function to render, in a case where the display frame in the virtual space is virtually photographed from a virtual viewpoint that is substantially the same viewpoint as a photographing viewpoint of the photographing unit, a three-dimensional virtual object that is viewed behind the display area when the display frame is photographed from the virtual viewpoint by assuming that the display area of the display frame is a transmission area, and to display the three-dimensional virtual object in the display area of the display frame. The rendering unit 24 is configured so as to render the three-dimensional virtual object, which is viewed behind the display area when the virtual space is photographed from the virtual viewpoint, in the display area. Namely, even though a display frame and a plurality of three-dimensional virtual objects are arranged in virtual space, all of these are not superimposed and displayed onto a photographed image, but the rendering unit 24 is configured to render one or more three-dimensional virtual object in the virtual space with respect to only a display area of the display frame, superimpose and display only the display frame having the display area onto the photographed image. Therefore, it is necessary to arrange three-dimensional virtual objects in the virtual space so that a three-dimensional virtual object, which the terminal device 20 wants to show the user, is projected in a display area. It is preferable that a position of the virtual viewpoint in the virtual space when the rendering is executed is the same as the photographing viewpoint of the photographing unit. However, it is not necessary that the position completely matches with the photographing viewpoint, and there is no problem even if they are slightly shifted so long as the user does not feel uncomfortable in this shift.

The storing unit 25 has a function to store information necessary for processes of the respective units in the image processing apparatus 20A. Further, the storing unit 25 also has a function to store various kinds of information generated by the processes of the respective units.

Figure 3:
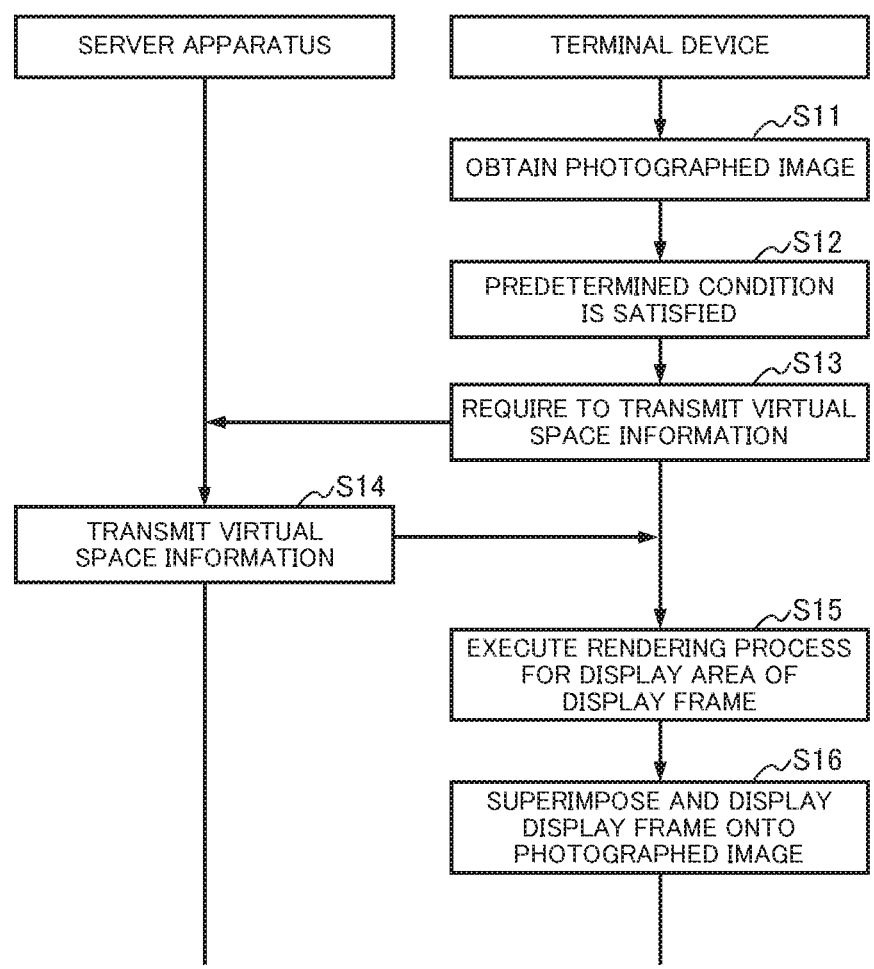
FIG. 3 is a flowchart illustrating an example of image processing corresponding to at least one of the embodiments of the present invention.

FIG. 3 is a flowchart illustrating an example of image processing corresponding to at least one of the embodiments of the present invention. Hereinafter, a case where the server apparatus 10 and the terminal device 20A execute image processing will be described as an example.

The image processing is started in a case where the terminal device 20A obtains a photographed image (Step S11). The terminal device 20A first determines whether a predetermined condition for displaying a display frame is satisfied or not (Step S12). In a case where it is determined that the predetermined condition is satisfied, the terminal device 20A requires the server apparatus 10 to transmit virtual space information to the terminal device 20A (Step S13). Here, the virtual space information is stored in the server apparatus 10 so as to be associated with a display frame corresponding to the satisfied predetermined condition. The server apparatus 10 transmits the virtual space information stored so as to be associated with the display frame to the terminal device 20A (Step S14). The terminal device 20A executes a rendering process for a display area of the display frame on the basis of the obtained virtual space information and a virtual viewpoint corresponding to a photographing viewpoint of the terminal device 20A (Step S15). The terminal device 20A then superimposes and displays the display frame with a state where the rendering process for the display area has been executed onto the photographed image (Step S16), and terminates the image processing. In this regard, only a case where one rendering result is superimposed and displayed is described by using this flowchart. However, the simplest configuration is merely described as an example. It goes without saying that in a case where a virtual space is always rendered and a rendering result is outputted for every frame like a moving image, it is required to execute a rendering process and a superimposing and displaying process for every frame. This also applies to description regarding the other flowcharts that appear below.

Figure 4:
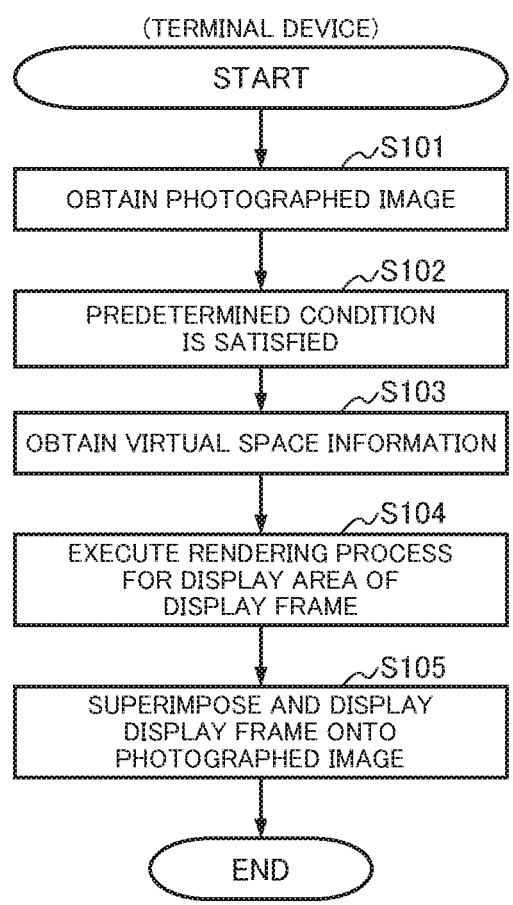
FIG. 4 is a flowchart illustrating an example of an operation of a terminal device side in a case where the terminal device executes the image processing corresponding to at least one of the embodiments of the present invention.

FIG. 4 is a flowchart illustrating an example of an operation of a terminal device side in a case where the terminal device 20A executes the image processing. Here, an operation in a case where the terminal device 20A executes the image processing will be described.

The image processing is started in a case where the terminal device 20A obtains a photographed image (Step S101). The terminal device 20A first determines whether a predetermined condition for displaying a display frame is satisfied or not (Step S102). In a case where it is determined that the predetermined condition is satisfied, the terminal device 20A obtains virtual space information stored therein so as to be associated with a display frame corresponding to the satisfied predetermined condition (Step S103). The terminal device 20A executes a rendering process for a display area of the display frame on the basis of the obtained virtual space information and a virtual viewpoint corresponding to a photographing viewpoint of the terminal device 20A (Step S104). The terminal device 20A then superimposes and displays the display frame with a state where the rendering process for the display area has been executed onto the photographed image (Step S105), terminates the image processing.

Figure 5:
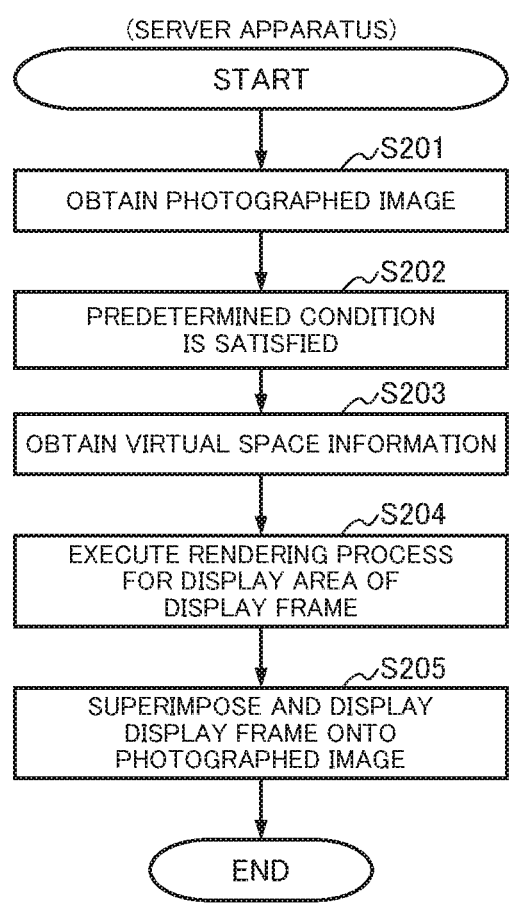
FIG. 5 is a flowchart illustrating an example of an operation of a server apparatus side in a case where the server apparatus executes the image processing corresponding to at least one of the embodiments of the present invention.

FIG. 5 is a flowchart illustrating an example of an operation of a server apparatus side in a case where the server apparatus 10 executes the image processing. Hereinafter, a case where the server apparatus 10 mainly executes the image processing will be described as an example. In this regard, the server apparatus 10 is configured so as to include the similar functions to those of the terminal device 20A except that various kinds of information are received from the terminal device 20A. For this reason, its description is omitted from a point of view to avoid repeated explanation.

The image processing is started in a case where the server apparatus 10 obtains a photographed image (Step S201). The server apparatus 10 first determines whether a predetermined condition for displaying a display frame is satisfied or not (Step S202). In a case where it is determined that the predetermined condition is satisfied, the server apparatus 10 obtains virtual space information stored therein so as to be associated with the display frame corresponding to the satisfied predetermined condition (Step S203). The server apparatus 10 executes a rendering process for a display area of the display frame on the basis of the obtained virtual space information and a virtual viewpoint corresponding to a photographing viewpoint of the terminal device 20A (Step S204). The server apparatus 10 then superimposes and displays the display frame with a state where the rendering process for the display area has been executed onto the photographed image (Step S205), and terminates the image processing. A final superimposed image is to be displayed by the display unit of the terminal device 20A.

As explained above, as one side of the first embodiment, the image processing apparatus 20A provided with the photographing unit and the display unit includes the photographed image obtaining unit 21, the display frame displaying unit 22, the virtual space information obtaining unit 23, the rendering unit 24, and the storing unit 25. Thus, the photographed image obtaining unit 21 obtains the photographed image obtained by photographing the real space by the photographing unit; the display frame displaying unit 22 displays the display frame in the display area of the photographed image in a case where the predetermined condition is satisfied, the display frame being one of the virtual objects and having one or more display areas; the virtual space information obtaining unit 23 obtains the virtual space information at least containing the three-dimensional virtual object information regarding one or more three-dimensional virtual objects arranged in the virtual space in advance and the positional relationship information between each of the three-dimensional virtual objects and the display frame; and the rendering unit 24 renders, in a case where the display frame in the virtual space is virtually photographed from the virtual viewpoint that is substantially the same viewpoint as the photographing viewpoint of the photographing unit, the three-dimensional virtual object that is viewed behind the display area when the display frame is photographed from the virtual viewpoint by assuming that the display area of the display frame is the transmission area, and display the three-dimensional virtual object in the display area of the display frame. Therefore, it becomes possible to convert a three-dimensional virtual object with a complicated configuration into a two-dimensional display image displaying the converted two-dimensional display image while a processing load is reduced.

Namely, by fixing a position of the virtual viewpoint for rendering to a position of substantially the same viewpoint as the photographing viewpoint of the photographing unit to photograph the display frame from this viewpoint, it is possible to have a simple configuration in which a three-dimensional virtual object that the user wants to show is arranged in advance behind a display frame when viewed from the user. By restricting photographing from a single viewpoint in this manner, it becomes possible to reduce a processing load compared with a case where rendering processes from a plurality of viewpoints are executed in parallel.

Second Embodiment

Figure 6:
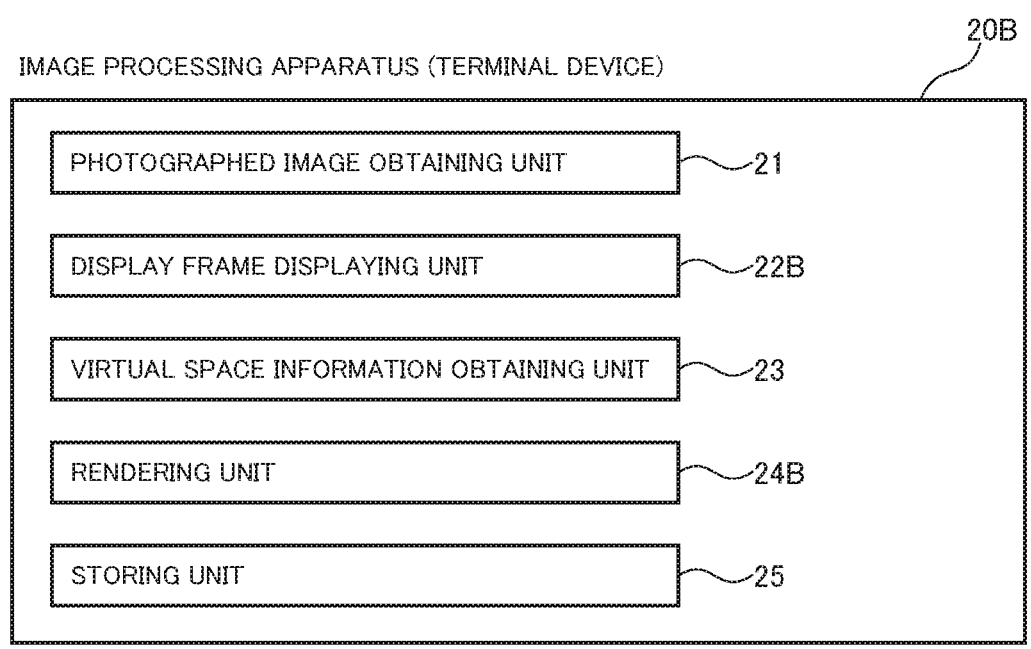
FIG. 6 is a block diagram illustrating a configuration of an image processing apparatus corresponding to at least one of the embodiments of the present invention.

FIG. 6 is a block diagram illustrating a configuration of an image processing apparatus corresponding to at least one of the embodiments of the present invention. As illustrated in FIG. 6, an image processing apparatus 20B at least includes a photographed image obtaining unit 21, a display frame displaying unit 22B, a virtual space information obtaining unit 23, a rendering unit 24B, and a storing unit 25. In this regard, a server apparatus 10 and a terminal device 20 may be configured so as to execute image processing in conjunction with each other. Alternatively, the terminal device 20 may be configured so as to execute the image processing by a single body. However, in any case, the image processing is based on a situation where the terminal device 20 is utilized by a user. For this reason, in the example illustrated in FIG. 6, a case where the terminal device 20 serves as the image processing apparatus 20B will be described as an example. Hereinafter, the image processing apparatus 20B may also be referred to as a "terminal device 20B".

The display frame displaying unit 22B has a function to display a display frame in a display area of a photographed image in a case where a predetermined condition is satisfied. The display frame is one of virtual objects, and has one or more display areas. Further, in this second embodiment, three-dimensional virtual objects are registered so as to be respectively associated with identification IDs. A filter with which any identification ID can be associated can be set to each of the display areas of the display frame. Here, the identification ID means an ID for identifying a three-dimensional virtual object. Further, the filter means a filter for setting which three-dimensional virtual object is drawn by setting an identification ID to a display area or which three-dimensional virtual object is not drawn. It is necessary to register the identification ID for the filter in advance.

The rendering unit 24B has a function to render, in a case where the display frame in the virtual space is virtually photographed from a virtual viewpoint that is substantially the same viewpoint as a photographing viewpoint of a photographing unit, a three-dimensional virtual object that is viewed behind the display area when the display frame is photographed from the virtual viewpoint by assuming that the display area of the display frame is a transmission area, and to display the three-dimensional virtual object in the display area of the display frame. Moreover, the rendering unit 24B also has a function to specify, on the basis of a filter set to the display area, a three-dimensional virtual object to be displayed, and execute rendering to display the three-dimensional virtual object in the display area. Namely, even a three-dimensional virtual object that is arranged at a position, at which the three-dimensional virtual object would be drawn in the display area during rendering in a case where there is no filter, is not allowed to be drawn by the filter. Alternatively, a three-dimensional virtual object to which prohibition on drawing is set is excluded from a drawing target during rendering.

Figure 7:
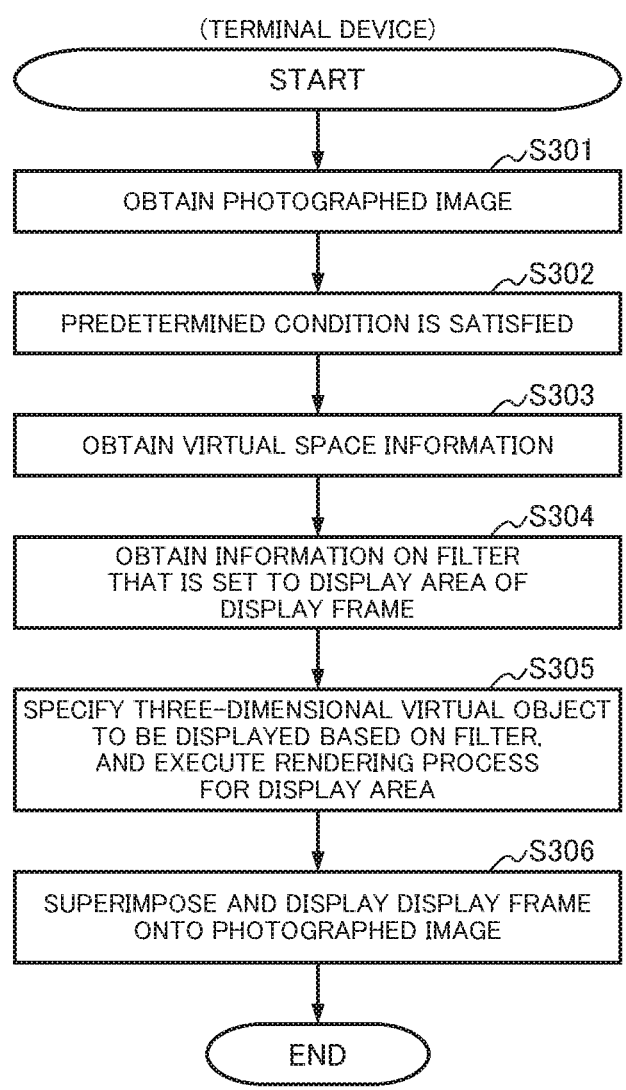
FIG. 7 is a flowchart illustrating an example of an operation of a terminal device side in a case where the terminal device executes image processing corresponding to at least one of the embodiments of the present invention.

FIG. 7 is a flowchart illustrating an example of an operation of a terminal device side in a case where the terminal device 20B executes image processing. Here, an operation in a case where the terminal device 20B executes the image processing will be described.

The image processing is started in a case where the terminal device 20B obtains a photographed image (Step S301). The terminal device 20B determines whether a predetermined condition for displaying a display frame is satisfied or not (Step S302). In a case where it is determined that the predetermined condition is satisfied, the terminal device 20B obtains virtual space information stored therein so as to be associated with the display frame corresponding to the satisfied predetermined condition (Step S303). Next, the terminal device 20B obtains information on a filter that is set to a display area of the display frame (Step S304). The terminal device 20B then specifies a three-dimensional virtual object to be displayed on the basis of the filter, and executes a rendering process for the display area of the display frame on the basis of the obtained virtual space information and a virtual viewpoint corresponding to a photographing viewpoint of the terminal device 20B (Step S305). Finally, the terminal device 20B superimposes and displays the display frame with a state where the rendering process for the display area has been executed onto the photographed image (Step S306), and terminates the image processing.

As explained above, as one side of the second embodiment, the image processing apparatus 20B provided with the photographing unit and the display unit is configured so as to include the photographed image obtaining unit 21, the display frame displaying unit 22B, the virtual space information obtaining unit 23, the rendering unit 24B, and the storing unit 25. Thus, the identification IDs are respectively associated with the three-dimensional virtual objects, and the filter with which any identification ID can be associated can be set to each of the display areas; and the rendering unit 24B specifies, on the basis of the filter set to the display area, the three-dimensional virtual object to be displayed, and executes rendering to display the three-dimensional virtual object in the display area. Therefore, it becomes possible to arbitrarily set the three-dimensional virtual object to be displayed in the display area by the filter.

Namely, a situation occurs in which a three-dimensional virtual object is desired to be displayed in a certain display area, but the three-dimensional virtual object is not desired to be displayed in an adjacent display area. In a case where the display frame desired to be shown is configured only depending upon how the three-dimensional object is arranged behind the display area when viewed from a virtual viewpoint, a problem occurs in which when a large three-dimensional virtual object is arranged, the large three-dimensional virtual object may also be drawn in a display area in which the large three-dimensional virtual object is not desired to be displayed. Therefore, for example, by setting an identification ID of a three-dimensional object that is not desired to be displayed to a filter for a display area in which the three-dimensional object is not desired to be displayed, it becomes possible to exclude the three-dimensional object from the drawing target during rendering by the filter even though the three-dimensional object that is not desired to be displayed protrudes toward a drawing range of the display area. This makes it possible to improve a degree of freedom for arrangement of the three-dimensional virtual object in the virtual space.

Third Embodiment

Figure 8:
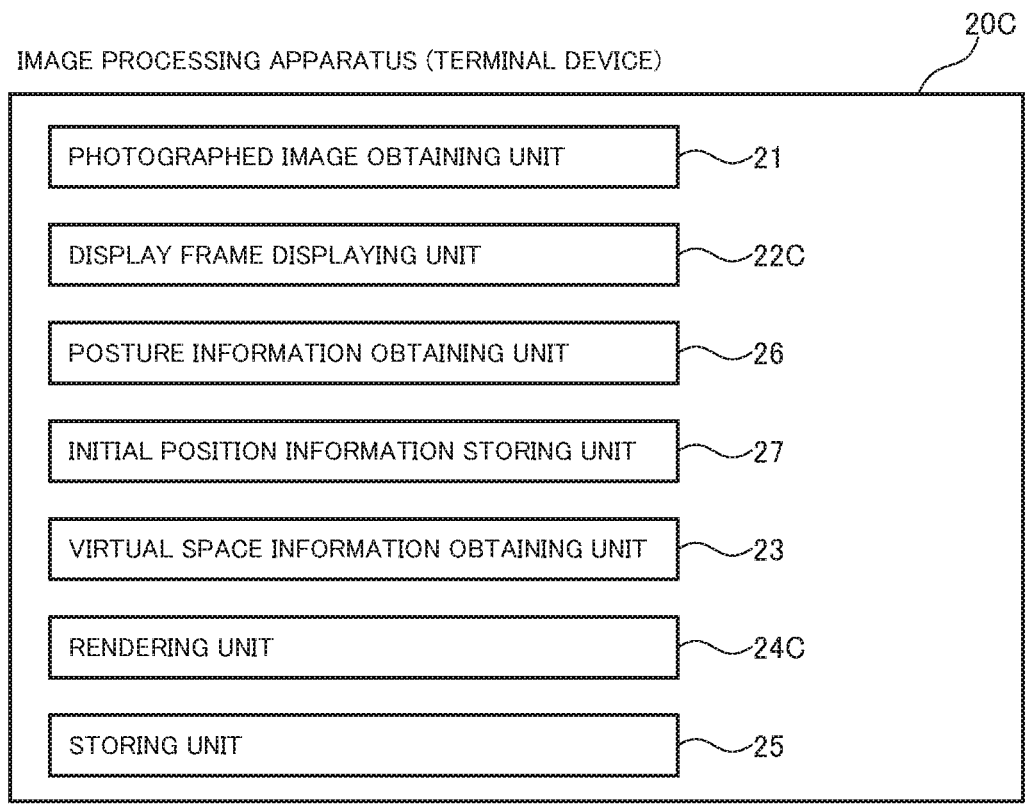
FIG. 8 is a block diagram illustrating a configuration of an image processing apparatus corresponding to at least one of the embodiments of the present invention.

FIG. 8 is a block diagram illustrating a configuration of an image processing apparatus corresponding to at least one of the embodiments of the present invention. As illustrated in FIG. 8, an image processing apparatus 20C at least includes a photographed image obtaining unit 21, a display frame displaying unit 22C, a posture information obtaining unit 26, an initial position information storing unit 27, a virtual space information obtaining unit 23, a rendering unit 24C, and a storing unit 25. In this regard, a server apparatus 10 and a terminal device 20 may be configured so as to execute image processing in conjunction with each other. Alternatively, the terminal device 20 may be configured so as to execute the image processing by a single body. However, in any case, the image processing is based on a situation where the terminal device 20 is utilized by a user. For this reason, in the example illustrated in FIG. 8, a case where the terminal device 20 serves as the image processing apparatus 20C will be described as an example. Hereinafter, the image processing apparatus 20C may also be referred to as a "terminal device 20C".

The posture information obtaining unit 26 has a function to obtain posture information that contains at least one of a photographing direction, a photographing angle, or a moving direction. These data are specified on the basis of information obtained by various kinds of sensors, which are included in the terminal device 20C. Here, the posture information means information that is to be utilized for specifying a posture state of the terminal device 20C. The posture information may contain various kinds of posture information in addition to the photographing direction, the photographing angle, and the moving direction. Any of the various kinds of sensors may be adopted so long as it is a sensor for obtaining posture information of the terminal device 20C. For example, an orientation sensor, a gyro sensor, a GPS device may be cited. As the posture information, posture information that is converted by the terminal device 20C may be obtained, or the terminal device 20C may obtain sensor information to execute a converting process from the sensor information to posture information.

The initial position information storing unit 27 has a function to at least store, as an initial position, a relative positional relationship between a position of the terminal device 20C when a display frame is first displayed by the display frame displaying unit 22C and a position of the terminal device 20C in a case where the display frame is assumed to exist in a real space. There are various methods of determining where is the position of the display frame to be first displayed, and any method may be adopted. For example, a method of registering a position at which the display frame is displayed so as to be associated with positional information such as a coordinate position in the space or latitude/longitude information in advance, a method of defining a position away from a predetermined distance from the position of the terminal device 20C when a predetermined condition is satisfied to a position at which a display frame is displayed, and the like are thought. In a case where the display position of the display frame is defined so as to be associated with fixed positional information, it is possible to specify the initial position by obtaining the positional information of the terminal device 20C. In a case where the display position of the display frame is not defined in advance, the initial position is stored by plotting the initial position of each of the terminal device 20C and the display frame in the virtual space or storing the initial position so as to be associated with a real coordinate position. Further, information on a display direction of the display frame is also contained in the information stored as the initial position.

The display frame displaying unit 22C has a function to display a display frame in a display area of a photographed image in a case where a predetermined condition is satisfied. The display area is one of virtual objects, and has one or more display areas. Here, in the present embodiment, the display frame including a display direction thereof is fixed at the initial position thereof. Thus, in a case where posture information of the terminal device 20C is changed and a photographing viewpoint is thereby changed, a virtual viewpoint in a virtual space with respect to the display frame is also changed. Therefore, in a case where the posture information of the terminal device 20C is changed from the initial position thereof, an image obtained by photographing the display frame positioned at the initial position from a virtual viewpoint that is substantially the same viewpoint as the photographing viewpoint after change is superimposed and displayed onto the photographed image.

The rendering unit 24C has a function to render, in a case where the display frame in the virtual space is virtually photographed from a virtual viewpoint that is substantially the same viewpoint as a photographing viewpoint of a photographing unit, a three-dimensional virtual object that is viewed behind the display area when the display frame is photographed from the virtual viewpoint by assuming that the display area of the display frame is a transmission area, and to display the three-dimensional virtual object in the display area of the display frame. Here, the display frame according to the present embodiment including the display direction thereof is fixed at the initial position thereof. Thus, in a case where posture information of the terminal device 20C is changed and a photographing viewpoint is thereby changed, a virtual viewpoint in a virtual space with respect to the display frame is also changed. Therefore, in a case where the posture information of the terminal device 20C is changed from the initial position thereof, a three-dimensional virtual object behind the display area is rendered in the display area when the display area of the display frame positioned at the initial position thereof is photographed from a virtual viewpoint that is substantially the same viewpoint as the photographing viewpoint after change.

Figure 9:
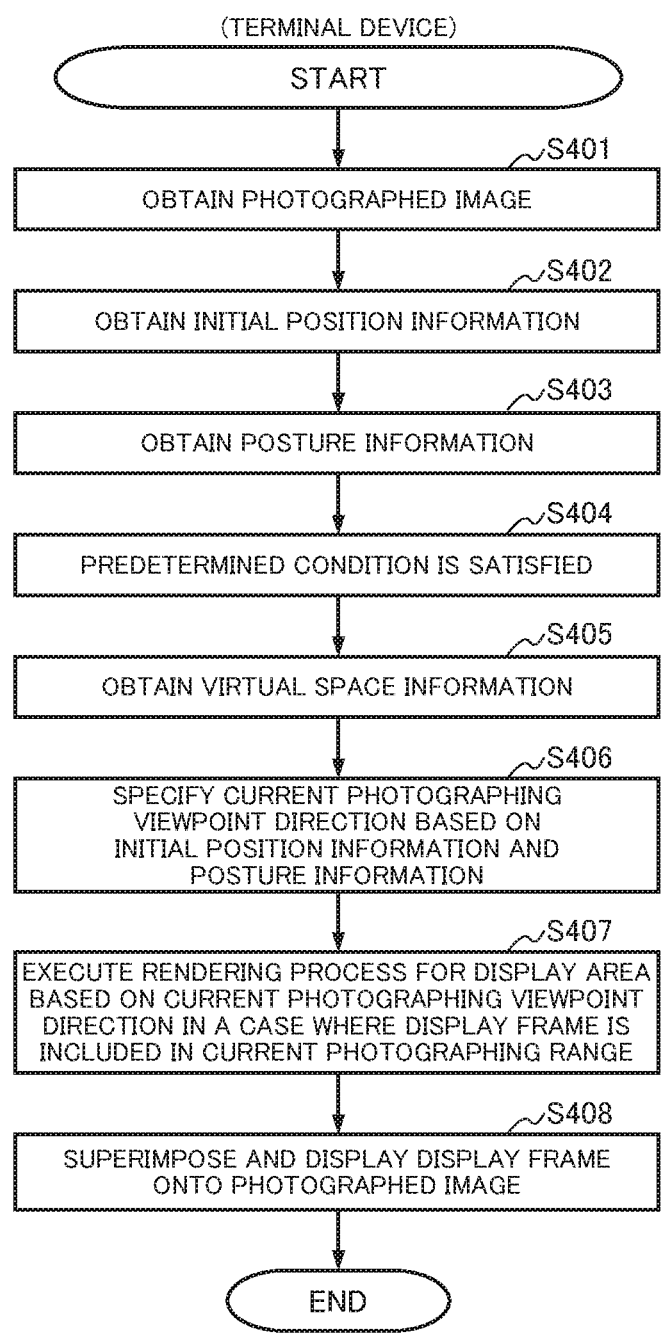
FIG. 9 is a flowchart illustrating an example of an operation of a terminal device side in a case where the terminal device executes image processing corresponding to at least one of the embodiments of the present invention.

FIG. 9 is a flowchart illustrating an example of an operation of a terminal device side in a case where the terminal device 20C executes image processing. Here, an operation in a case where the terminal device 20C executes the image processing will be described.

The image processing is started in a case where the terminal device 20C obtains a photographed image (Step S401). Further, the terminal device 20C obtains initial position information on the terminal device 20C and a display frame (Step S402). Moreover, the terminal device 20C also obtains posture information (Step S403). Next, the terminal device 20C determines whether a predetermined condition for displaying the display frame is satisfied or not (Step S404). In a case where it is determined that the predetermined condition is satisfied, the terminal device 20C obtains virtual space information that is stored so as to be associated with the display frame corresponding to the satisfied predetermined condition (Step S405). Next, the terminal device 20C specifies a current photographing viewpoint direction on the basis of the obtained initial position information and the obtained posture information (Step S406). Then, in a case where a display position of the display frame is included in a photographing range of a current photographed image, the terminal device 20C executes a rendering process for the display area on the basis of the current photographing viewpoint direction (Step S407). Finally, the terminal device 20C superimposes and displays the display frame in a state where the rendering process for the display area is executed onto the photographed image (Step S408), and terminates the image processing.

As explained above, as one side of the third embodiment, the image processing apparatus 20C provided with the photographing unit and the display unit is configured so as to include the photographed image obtaining unit 21, the display frame displaying unit 22C, the posture information obtaining unit 26, the initial position information storing unit 27, the virtual space information obtaining unit 23, the rendering unit 24C, and the storing unit 25. Thus, the initial position information storing unit 27 at least stores, as the initial position, the relative positional relationship between the position of the terminal device 20C when the display frame is first displayed by the display frame displaying unit 22C and the position of the terminal device 20C in a case where the display frame is assumed to exist in the real space; the display frame displaying unit 22C displays, in a case where the relative positional relationship between the terminal device 20C and the display frame or the photographing viewpoint is changed by changing the posture state of the terminal device, the display frame positioned at the initial position from the photographing viewpoint after change; and the rendering unit 24C executes rendering on the basis of the virtual viewpoint that is substantially the same viewpoint as the photographing viewpoint after change. Therefore, it becomes possible to display the three-dimensional virtual object corresponding to the photographing viewpoint after change in the display area of the display frame.

Namely, a positional relationship between the display frame and the three-dimensional virtual object in the virtual space is fixed in a state that the positional relationship is set in advance. However, when the positional relationship between the terminal device 20C and the display frame or the photographing angle is changed, appearance of the three-dimensional virtual object arranged behind the display frame in the virtual space is changed by rendering the three-dimensional virtual object arranged behind the display area when viewed from the photographing viewpoint after change. Therefore, in a case where the display frame superimposed and displayed onto the photographed image of the terminal device 20C is observed while changing an angle with respect to the display frame by using an AR technique when viewed from the user, the three-dimensional virtual object rendered in the display area of the display frame is changed. This makes it possible to display such an image that the user looks into a virtual space provided behind the display area by using the display area as a window frame. Further, a degree of freedom for arrangement can be improved and this makes it possible to execute a display that attracts the interest of the user by, for example, arranging a three-dimensional object at a position at which the three-dimensional object can be seen only when an angle is changed.

Fourth Embodiment

Figure 10:
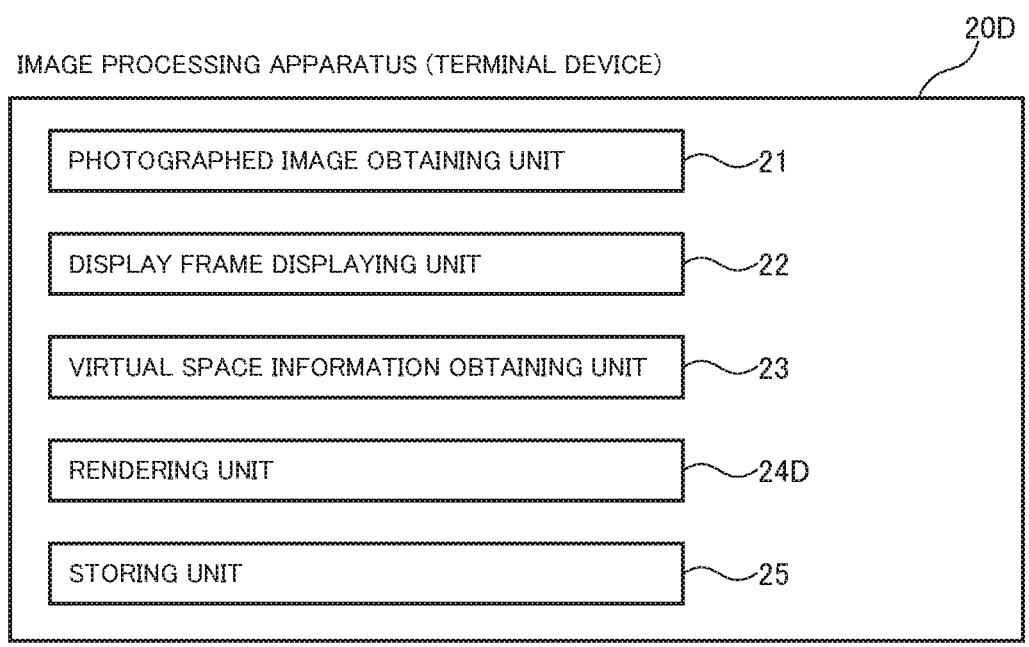
FIG. 10 is a block diagram illustrating a configuration of an image processing apparatus corresponding to at least one of the embodiments of the present invention.

FIG. 10 is a block diagram illustrating a configuration of an image processing apparatus corresponding to at least one of the embodiments of the present invention. As illustrated in FIG. 10, an image processing apparatus 20D at least includes a photographed image obtaining unit 21, a display frame displaying unit 22, a virtual space information obtaining unit 23, a rendering unit 24D, and a storing unit 25. In this regard, the server apparatus 10 and the terminal device 20 may be configured so as to execute image processing in conjunction with each other. Alternatively, the terminal device 20 may be configured so as to execute the image processing by a single body. However, in any case, the image processing is based on a situation where the terminal device 20 is utilized by a user. For this reason, in the example illustrated in FIG. 10, a case where the terminal device 20 serves as the image processing apparatus 20D will be described as an example. Hereinafter, the image processing apparatus 20D may also be referred to as a "terminal device 20D".

The rendering unit 24D has a function to render, in a case where a display frame in a virtual space is virtually photographed from a virtual viewpoint that is substantially the same viewpoint as a photographing viewpoint of a photographing unit, a three-dimensional virtual object that is viewed behind the display area when the display frame is photographed from the virtual viewpoint by assuming that the display area of the display frame is a transmission area, and to display the three-dimensional virtual object in the display area of the display frame. Moreover, the rendering unit 24D also has a function to temporarily erasure a three-dimensional virtual object designated by a temporary erasure setting, and execute rendering to display the three-dimensional virtual object in the display area. In this fourth embodiment, the rendering unit 24D can set the temporary erasure setting in which: three-dimensional virtual objects are registered so as to be respectively associated with identification IDs; a three-dimensional virtual object with a designated identification ID is temporarily erased from the virtual space during rendering of the display area; and the rendering is then executed. Here, the temporary erasure setting means a setting for temporarily erasing the three-dimensional virtual object with the designated identification ID from the virtual space during rendering of the display area. It is necessary to register identification IDs as the temporary erasure setting in advance. Namely, the rendering unit 24D is configured to temporarily erase the three-dimensional virtual object arranged in the virtual space. Therefore, it becomes possible to display another three-dimensional virtual object, which is arranged behind the three-dimensional object as an erasure target when viewed from the photographing viewpoint in the display area. This temporary erasure setting may be any setting so long as the three-dimensional virtual object with the designated identification ID can be temporarily erased from the virtual space during rendering. However, for example, the temporary erasure setting may be executed for each of the three-dimensional virtual objects, and the temporary erasure setting set to each of the three-dimensional virtual objects can be rewritten in a case where a condition that becomes a trigger to start a rendering process for the display frame or the display area is satisfied. Namely, the rendering unit 24D may be configured to execute a process in which a three-dimensional virtual object is not temporarily erased in a case where a predetermined condition is not satisfied; but the three-dimensional virtual object is temporarily erased in a case where the predetermined condition is satisfied.

Figure 11:
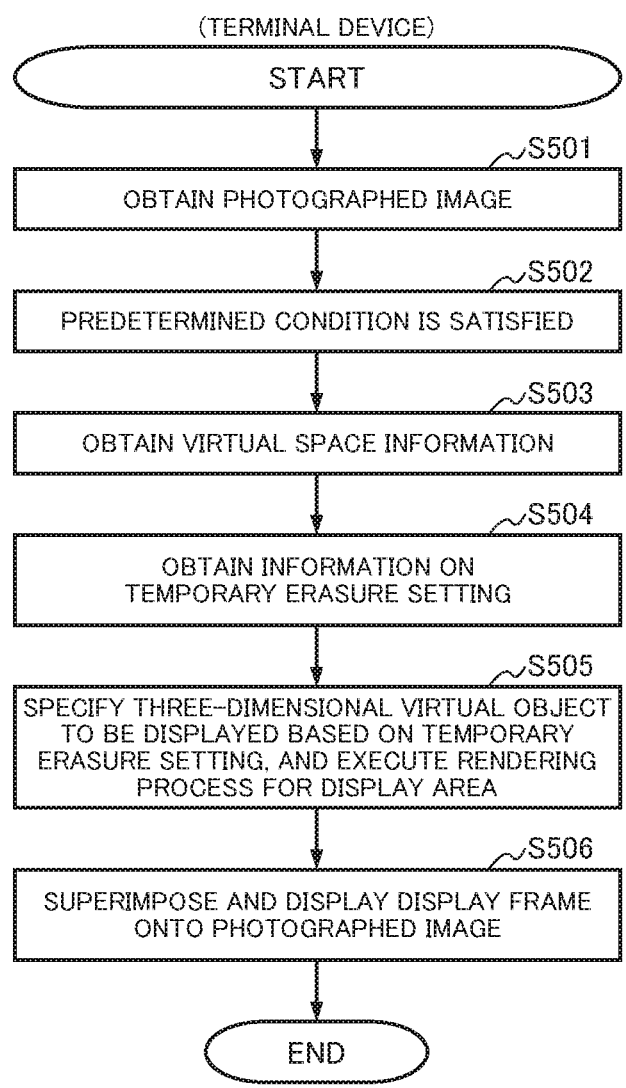
FIG. 11 is a flowchart illustrating an example of an operation of a terminal device side in a case where the terminal device executes image processing corresponding to at least one of the embodiments of the present invention.

FIG. 11 is a flowchart illustrating an example of an operation of a terminal device side in a case where the terminal device 20D executes image processing. Here, an operation in a case where the terminal device 20D executes the image processing will be described.

The image processing is started in a case where the terminal device 20D obtains a photographed image (Step S501). The terminal device 20D determines whether a predetermined condition for displaying a display frame is satisfied or not (Step S502). In a case where it is determined that the predetermined condition is satisfied, the terminal device 20D obtains virtual space information stored therein so as to be associated with the display frame corresponding to the satisfied predetermined condition (Step S503). Next, the terminal device 20D obtains information on temporary erasure setting (Step S504). The terminal device 20D then specifies a three-dimensional virtual object to be displayed on the basis of the information on the temporary erasure setting; temporarily erases the three-dimensional virtual object designated by the temporary erasure setting from the obtained virtual space information; and executes a rendering process for a display area of the display frame on the basis of the virtual space information after temporary erasure and a virtual viewpoint corresponding to a photographing viewpoint of the terminal device 20D (Step S505). Finally, the terminal device 20D superimposes and displays the display frame in a state that the rendering process for the display area is executed onto the photographed image (Step S506), and terminates the image processing.

As explained above, as one side of the fourth embodiment, the image processing apparatus 20D provided with the photographing unit and the display unit is configured so as to include the photographed image obtaining unit 21, the display frame displaying unit 22, the virtual space information obtaining unit 23, the rendering unit 24D, and the storing unit 25. Thus, the identification IDs are respectively associated with the three-dimensional virtual objects; the temporary erasure setting can be set in which a three-dimensional virtual object with a designated identification ID is temporarily erased from the virtual space during rendering of the display area, and the rendering is then executed; and the rendering unit 24D temporarily erases the three-dimensional virtual object designated by the temporary erasure setting from the virtual space, and executes rendering to display the three-dimensional virtual object in the display area. Therefore, it becomes possible to temporarily erase the three-dimensional virtual object to be displayed in the display area from the virtual space by the temporary erasure setting.

Namely, in a situation that a three-dimensional virtual object is desired to be displayed in a certain display area, but the three-dimensional virtual object is not desired to be displayed in an adjacent display area, in a case where another three-dimensional virtual object arrange behind a three-dimensional virtual object can be displayed by temporarily erasing the three-dimensional virtual object, it becomes possible to display such a three-dimensional virtual object arranged behind the three-dimensional virtual object by setting the three-dimensional virtual object to be temporarily erased by the temporary erasure setting when a rendering process for the adjacent display area is executed.

Fifth Embodiment

Figure 12:
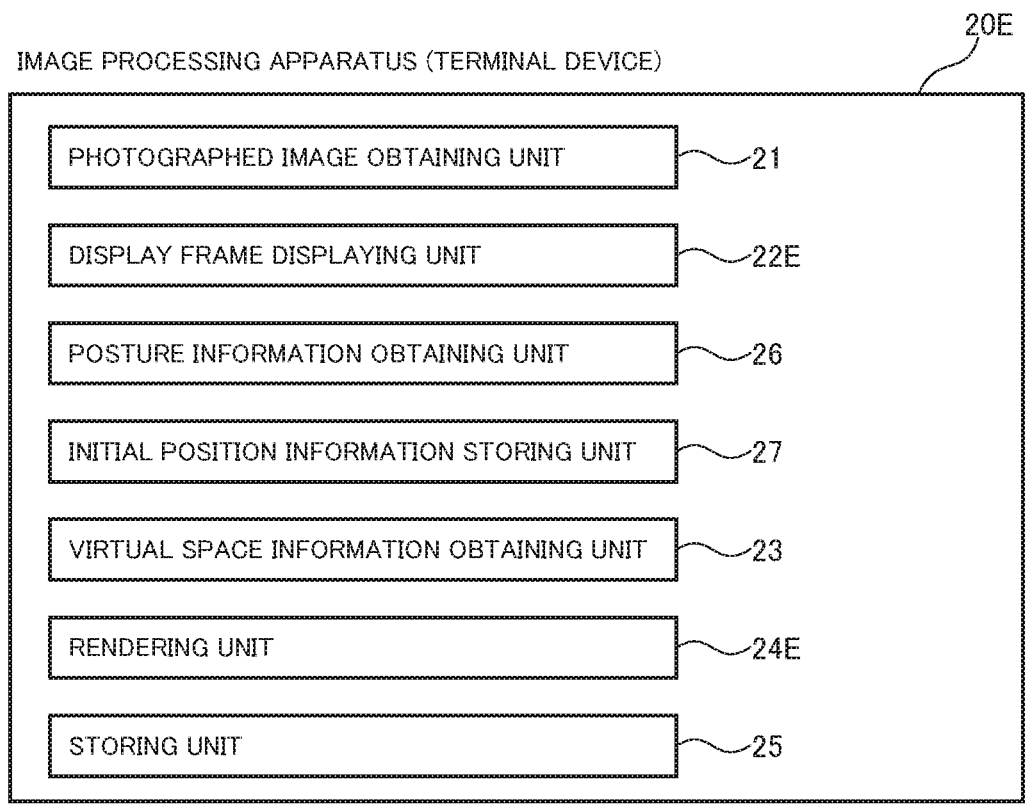
FIG. 12 is a block diagram illustrating a configuration of an image processing apparatus corresponding to at least one of the embodiments of the present invention.

FIG. 12 is a block diagram illustrating a configuration of an image processing apparatus corresponding to at least one of the embodiments of the present invention. As illustrated in FIG. 12, an image processing apparatus 20E at least includes a photographed image obtaining unit 21, a display frame displaying unit 22E, a posture information obtaining unit 26, an initial position information storing unit 27, a virtual space information obtaining unit 23, a rendering unit 24E, and a storing unit 25. In this regard, a server apparatus 10 and a terminal device 20 may be configured so as to execute image processing in conjunction with each other. Alternatively, the terminal device 20 may be configured so as to execute the image processing by a single body. However, in any case, the image processing is based on a situation where the terminal device 20 is utilized by a user. For this reason, in the example illustrated in FIG. 12, a case where the terminal device 20 serves as the image processing apparatus 20E will be described as an example. Hereinafter, the image processing apparatus 20E may also be referred to as a "terminal device 20E".

The photographed image obtaining unit 21 has a function to obtain a photographed image obtained by photographing a real space by a photographing unit of the terminal device 20E. For example, the photographed image obtaining unit 21 obtains a situation around the user as a photographed image of a still image or a moving image by a camera device of the terminal device 20E, such as a smartphone possessed by the user.

The display frame displaying unit 22E has a function to display a display frame in a display area of the photographed image in a case where a predetermined condition is satisfied. The display frame is one of virtual objects, and has one or more display areas. Further, in this fifth embodiment, identification IDs are respectively registered so as to be associated with three-dimensional virtual objects, and a filter with which the identification ID can be associated can be set to each of the display areas of the display frame. Here, the identification ID means an ID for identifying a three-dimensional virtual object. Further, the filter means a filter for setting which three-dimensional virtual object is drawn by setting an identification ID to a display area or which three-dimensional virtual object is not drawn. It is necessary to register the identification ID for the filter in advance.

The posture information obtaining unit 26 has a function to obtain posture information that contains at least one of a photographing direction, a photographing angle, or a moving direction. These data are specified on the basis of information obtained by various kinds of sensors, which are included in the terminal device 20E. Here, the posture information means information that is to be utilized for specifying a posture state of the terminal device 20E. The posture information may contain various kinds of posture information in addition to the photographing direction, the photographing angle, and the moving direction. Any of the various kinds of sensors may be adopted so long as it is a sensor for obtaining posture information of the terminal device 20E. For example, an orientation sensor, a gyro sensor, a GPS device may be cited. As the posture information, posture information that is converted by the terminal device 20E may be obtained, or the terminal device 20E may obtain sensor information to execute a converting process from the sensor information to posture information. Further, the terminal device 20E may obtain posture information from the photographed image photographed by the terminal device 20E. For example, it is possible to specify the posture information on the basis of a positional relationship with an object fixedly arranged in a real space, a way of viewing an object (for example, viewing an object so as to be inclined), and the like.

The initial position information storing unit 27 has a function to at least store, as an initial position, a relative positional relationship between a position of the terminal device 20E when a display frame is first displayed by the display frame displaying unit 22E and a position of the terminal device 20E in a case where the display frame is assumed to exist in a real space. There are various methods of determining where is the position of the display frame to be first displayed, and any method may be adopted. For example, a method of registering a position at which the display frame is displayed so as to be associated with positional information such as a coordinate position in the space or latitude/longitude information in advance, a method of defining a position away from a predetermined distance from the position of the terminal device 20E when a predetermined condition is satisfied to a position at which a display frame is displayed, and the like are thought. In a case where the display position of the display frame is defined so as to be associated with fixed positional information, it is possible to specify the initial position by obtaining the positional information of the terminal device 20E. In a case where the display position of the display frame is not defined in advance, the initial position is stored by plotting the initial position of each of the terminal device 20E and the display frame in the virtual space or storing the initial position so as to be associated with a real coordinate position. Further, information on a display direction of the display frame is also contained in the information stored as the initial position.

The virtual space information obtaining unit 23 has a function to obtain virtual space information. The virtual space information at least contains three-dimensional virtual object information regarding one or more three-dimensional virtual objects and positional relationship information between each of the three-dimensional virtual objects and the display frame. The one or more three-dimensional virtual objects are arranged in the virtual space in advance. The three-dimensional virtual object information means information required to specify a three-dimensional virtual object. For example, in a case where a three-dimensional virtual object is formed by a 3D polygon, texture information on a surface of each face is contained as the three-dimensional virtual object information in addition to apexes of the 3D polygon and information for specifying how faces of a polygon is configured. Further, in the present embodiment, the positional relationship information means information for specifying a positional relationship between a display frame definitely arranged in a virtual space and a three-dimensional virtual object arranged in the virtual space. In this regard, the content of the positional relationship between the display frame and the three-dimensional virtual object is not limited particularly. However, in order for the rendering unit 24 (will be described later) to render the three-dimensional object in the display area of the display frame, the positional relationship that becomes a rendering target when the display frame is photographed from a virtual viewpoint is required. The virtual space information at least containing the three-dimensional virtual object information and the positional relationship information is obtained by the virtual space information obtaining unit 23. This virtual space information may be configured so as to be stored in the storing unit 25 of the terminal device 20E, or may be configured so that the virtual space information is stored in the storing unit of the server apparatus 10 and the terminal device 20E obtains the virtual space information from the server apparatus 10 via a communication network 30.

The rendering unit 24E has a function to render, in a case where the display frame in the virtual space is virtually photographed from a virtual viewpoint that is substantially the same viewpoint as a photographing viewpoint of the photographing unit, a three-dimensional virtual object that is viewed behind the display area when the display frame is photographed from the virtual viewpoint by assuming that the display area of the display frame is a transmission area, and to display the three-dimensional virtual object in the display area of the display frame.

Further, the rendering unit 24E also has a function to specify a three-dimensional virtual object to be displayed on the basis of the filter set to the display area, and execute rendering to display the three-dimensional virtual object in the display area. Namely, even a three-dimensional virtual object that is arranged at a position, at which the three-dimensional virtual object would be drawn in the display area during rendering, is not allowed to be drawn by the filter. Alternatively, a three-dimensional virtual object to which prohibition on drawing is set is excluded from a drawing target during rendering.

Moreover, the rendering unit 24E has a function to temporarily erase a three-dimensional virtual object designated in a temporary erasure setting, and execute rendering to display the three-dimensional virtual object in the display area. In this fifth embodiment, the temporary erasure setting can be set in which: a three-dimensional virtual object with a designated identification ID is temporarily erased during rendering of the display area; and the rendering is then executed. Here, the temporary erasure setting means a setting for temporarily erasing the three-dimensional virtual object with the designated identification ID from the virtual space during rendering of the display area. It is necessary to register identification IDs as the temporary erasure setting in advance. This temporary erasure setting may be any setting so long as the three-dimensional virtual object with the designated identification ID can be temporarily erased from the virtual space during rendering. However, for example, the temporary erasure setting may be executed for each of the three-dimensional virtual objects, and the temporary erasure setting set to each of the three-dimensional virtual objects can be rewritten in a case where a condition that becomes a trigger to start a rendering process for the display frame or the display area is satisfied. Namely, the rendering unit 24E may be configured to execute a process in which a three-dimensional virtual object is not temporarily erased in a case where a predetermined condition is not satisfied; but the three-dimensional virtual object is temporarily erased in a case where the predetermined condition is satisfied. In this regard, the rendering unit 24E may be configured so as not to utilize the identification ID in a case where only a temporary erasure setting of each of the three-dimensional virtual objects.

This temporary erasure setting is configured to temporarily erase a three-dimensional virtual object arranged in the virtual space. Therefore, it becomes possible to display another three-dimensional virtual object, which is arranged behind the three-dimensional object as an erasure target, in the display area when viewed from the photographing viewpoint. However, in the temporary erasure setting, the designated three-dimensional virtual object is erased from the virtual space. Thus, the temporary erasure setting is configured to erase the three-dimensional virtual object from all of the display areas. Therefore, an idea is required in which even though a three-dimensional virtual object is erased from a virtual space for a certain display area by the temporary erasure setting, this does not influence on display of the other display areas. For example, the rendering process may not be started in a situation that a plurality of display areas is displayed at the same time, but the rendering process may first be started in a case where a positional relationship between the terminal device 20E and the display areas becomes closer and a situation that only one display area occupies most of the display screen occurs. Alternatively, when it becomes a situation that a photographing viewpoint direction is focused on one display area and does not change for a predetermined period, it may be determined that this state is a focused state that the user focuses on the display area. The rendering process may first be started in a case where it is determined to be the focused state. By configuring the terminal device 20E in this manner so that the condition that becomes the trigger to start the rendering process can be set, it is possible to prevent any influence from being exerted on the other display areas even though the three-dimensional virtual object is erased by the temporary erasure setting. In this regard, in a case where the condition that becomes the trigger to start the rendering process is not satisfied, the rendering process may be terminated and the three-dimensional virtual object that has been temporarily erased may be arranged in the virtual space again. This makes it possible to display the three-dimensional virtual object in any other display area without any incident.

Further, a display determining unit configured to determine whether any display area of the one or more display areas is contained in the display screen or not in a case where the display areas of the display frame on the display screen are changed may be provided. The rendering unit 24E may set the temporary erasure setting to be effective and execute rendering only in a case where a display area that is set so as to display a three-dimensional virtual object as an erasure target by the temporary erasure setting does not exist in the display area that the display determining unit determines to be included in the display screen.

The storing unit 25 has a function to store information necessary for processes of the respective units in the image processing apparatus 21E. Further, the storing unit 25 also has a function to store various kinds of information generated by the processes of the respective units.

Figure 13:
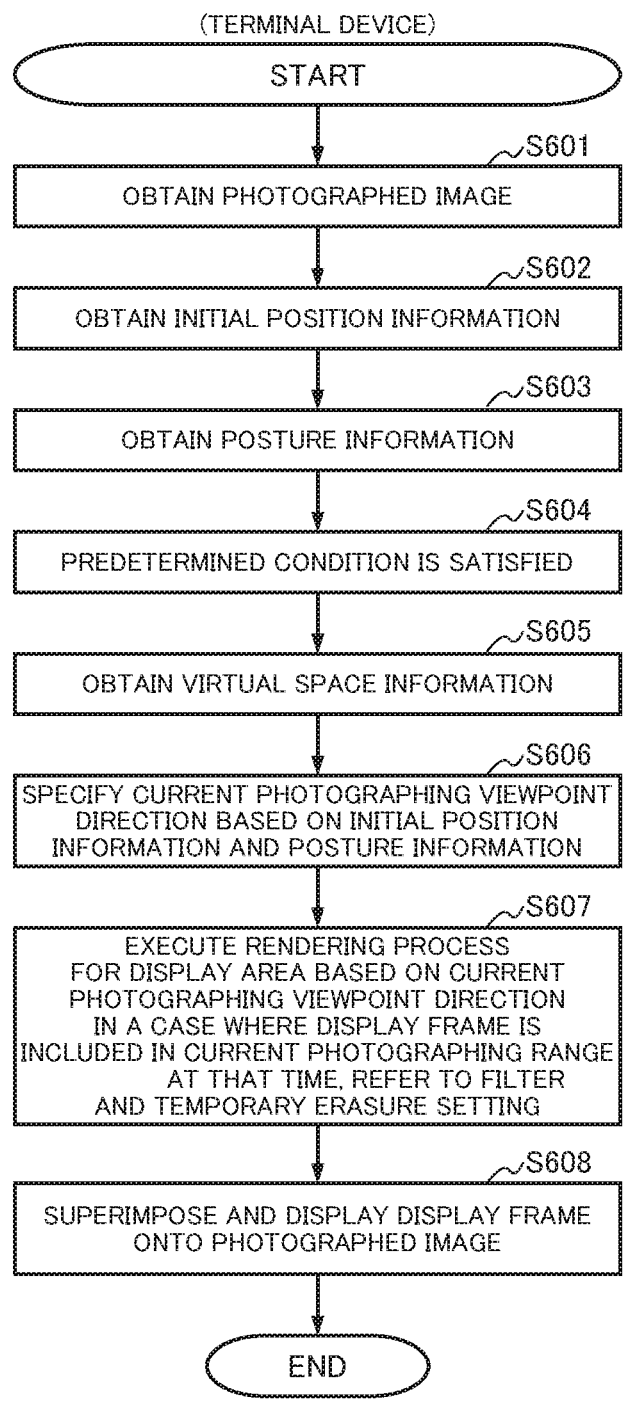
FIG. 13 is a flowchart illustrating an example of an operation of a terminal device side in a case where the terminal device executes image processing corresponding to at least one of the embodiments of the present invention.

FIG. 13 is a flowchart illustrating an example of an operation of a terminal device side in a case where the terminal device 20E executes image processing. Here, an operation of the terminal device 20E in a case where the terminal device 20E executes the image processing will be described.

The image processing is started in a case where the terminal device 20E obtains a photographed image (Step S601). Further, the terminal device 20E obtains initial position information on the terminal device 20E and a display frame (Step S602). Moreover, the terminal device 20E obtains posture information (Step S603). Next, the terminal device 20E determines whether a predetermined condition for displaying the display frame is satisfied or not (Step S604). In a case where it is determined that the predetermined condition is satisfied, the terminal device 20E obtains virtual space information stored therein so as to be associated with the display frame corresponding to the satisfied predetermined condition (Step S605). Next, the terminal device 20E specifies a current photographing viewpoint direction from the obtained initial position information and the obtained posture information (Step S606). The terminal device 20E then executes a rendering process for a display area on the basis of the current photographing viewpoint direction in a case where a display position of the display frame is included in a current photographing range of the photographed image (Step S607). At this time, in a case where at least one of information on a filter or information on a temporary erasure setting is set, the terminal device 20E specifies a three-dimensional virtual object to be displayed by using the information, and executes the rendering process. Finally, the terminal device 20E superimposes and displays the display frame in a state that the rendering process for the display area is executed onto the photographed image (Step S608), and terminates the image processing.

Figure 14:
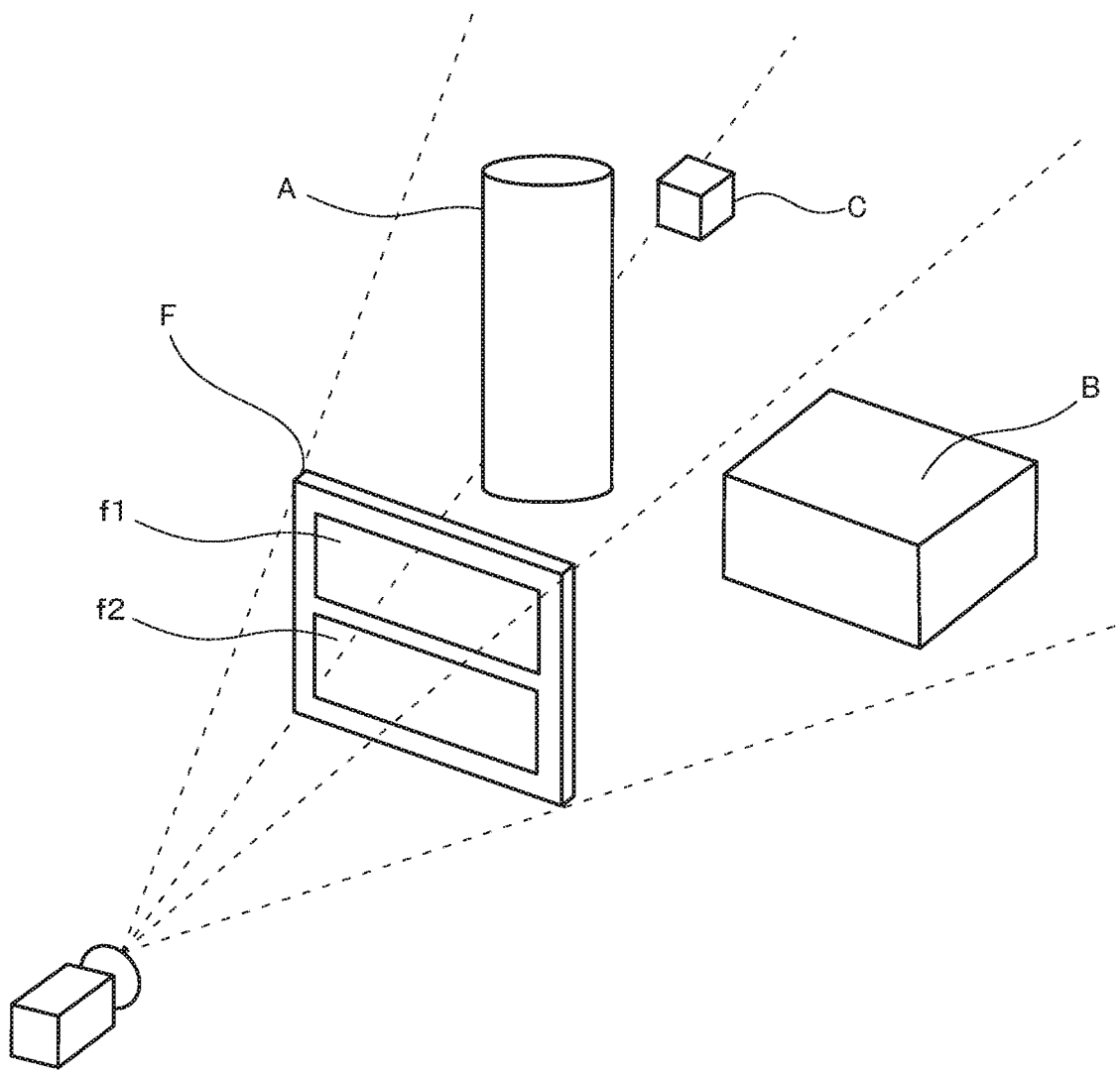
FIG. 14 is an explanatory drawing illustrating a state where a display frame and three-dimensional virtual objects are arranged in a virtual space corresponding to at least one of the embodiments of the present invention.

FIG. 14 is an explanatory drawing illustrating a state where a display frame and three-dimensional virtual objects are arranged in a virtual space. As illustrated in FIG. 14, a display frame F provided with two display areas f1 and f2 is arranged in a virtual space. Further, three three-dimensional virtual objects A, B, and C are also arranged in the virtual space. Such a virtual space is photographed by a virtual camera, and rendering for the display area is executed.

Figure 15:
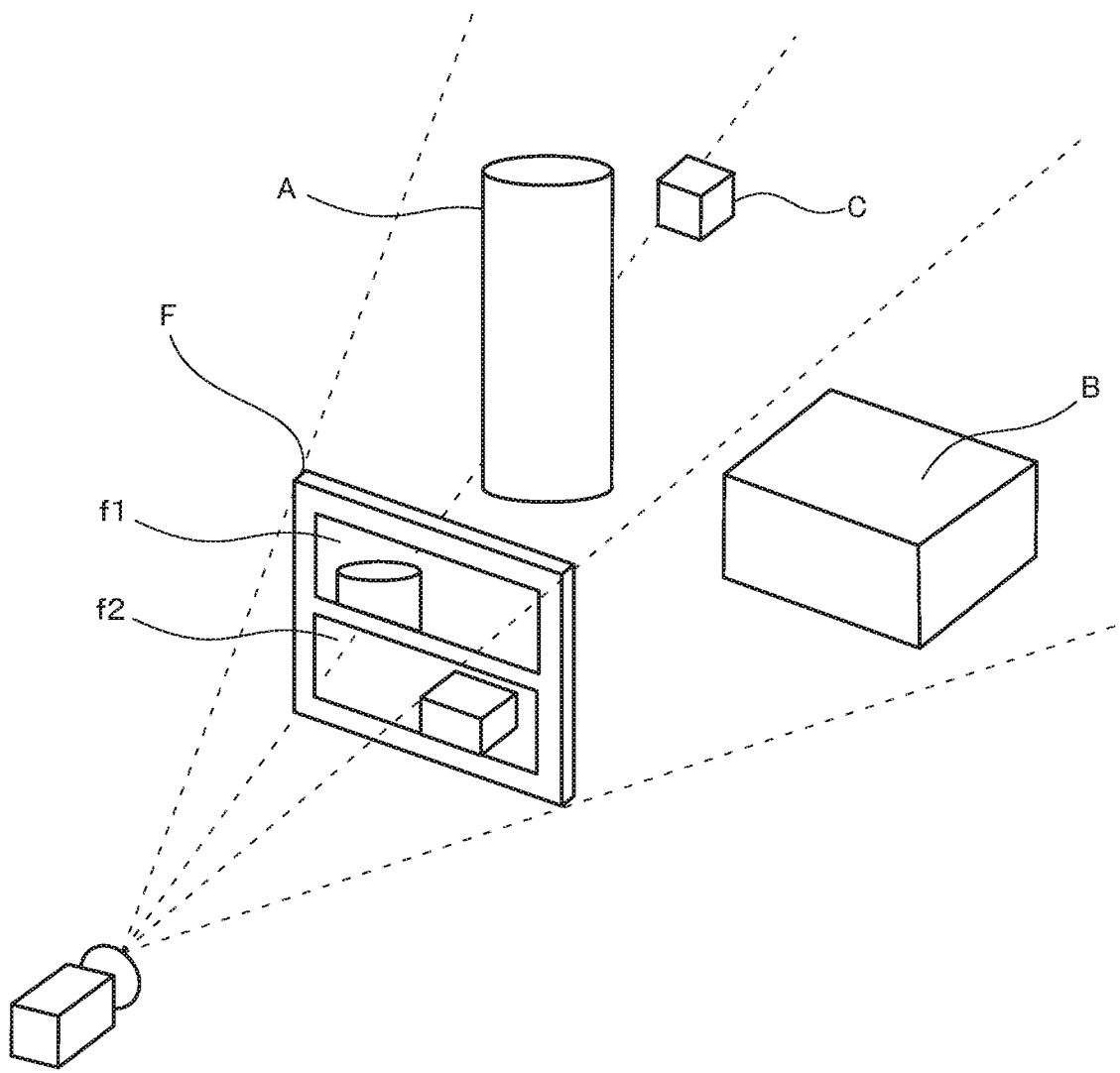
FIG. 15 is an explanatory drawing for explaining a function of a filter, which is set to a display area, corresponding to at least one of the embodiments of the present invention.

FIG. 15 is an explanatory drawing for explaining a function of a filter that is set to the display area. A rendering process is a process to render a three-dimensional virtual object, which is viewed behind a display area when a display frame is photographed from a virtual viewpoint by assuming that the display area of the display frame is a transmission area, and to display the three-dimensional virtual object in the display area. The three-dimensional virtual objects, which exist behind each of the display areas f1 and f2 when the display frame F is photographed from the virtual viewpoint of FIG. 14, are rendered. The three-dimensional virtual object A is rendered in the display area f1. Here, a filter for allowing only the three-dimensional virtual object B to be drawn is set to the display area f2. As illustrated in FIG. 15, the three-dimensional virtual object A would be a drawing target of the display area f2 if the filter is not set thereto. However, the three-dimensional virtual object A is not rendered in the display area f2, but only the three-dimensional virtual object B is rendered in the display area f2. In this regard, this filter setting is not a function to erase a three-dimensional virtual object from the virtual space. Therefore, even if the three-dimensional virtual object C is allowed to be drawn by the setting of the filter, the three-dimensional virtual object C is not drawn because the three-dimensional virtual object C is arranged behind the three-dimensional virtual object A and is completely hidden by the three-dimensional virtual object A.

Figure 16:
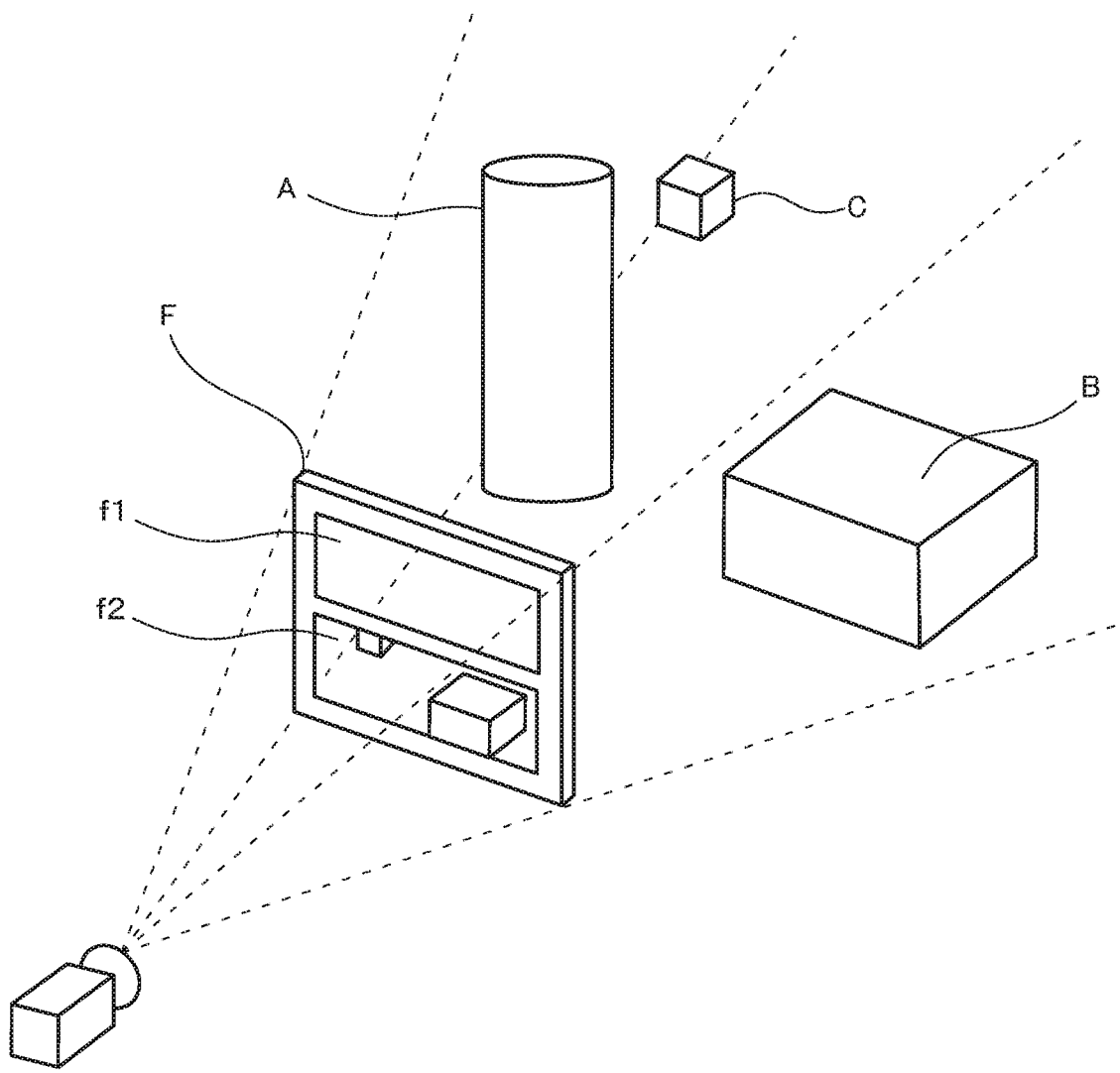
FIG. 16 is an explanatory drawing for explaining a function to set temporary erasure, which is set to the display area, corresponding to at least one of the embodiments of the present invention.

FIG. 16 is an explanatory drawing for explaining a function of temporary erasure setting. When the display frame F is photographed from a virtual viewpoint illustrated in FIG. 14, three-dimensional virtual objects that exist behind each of the display areas f1 and f2 becomes rendering targets. Here, a temporary erasure setting is set so as to temporarily erase the three-dimensional virtual object A from the virtual space. In this case, as illustrated in FIG. 16, although the three-dimensional virtual object A is drawn without the temporary erasure setting, the three-dimensional virtual object A is not rendered, but the three-dimensional virtual object C arranged behind the three-dimensional virtual object A is rendered. In this regard, since this temporary erasure setting is a function to temporarily erase a three-dimensional virtual object from the virtual space, this also influences on the display area other than the display area f2. Namely, as illustrated in FIG. 16, the three-dimensional virtual object A should be drawn in the display area f1, but as a result of erasing the three-dimensional virtual object A from the virtual space by the temporary erasure setting, the display frame F becomes a state where there is no three-dimensional virtual object to be displayed in the display area f1. In order to prevent such a situation from occurring, it is preferable that conditions, such as a condition that becomes a situation in which the positional relationship 20E between the terminal device and the display areas becomes closer and only one display area occupies most of the display screen, or a condition that becomes a situation (that is, the focused state) in which the photographing viewpoint direction is focused on one display area and does not change for the predetermined period, for example, are defined as triggers to start the rendering process.

Figure 17:
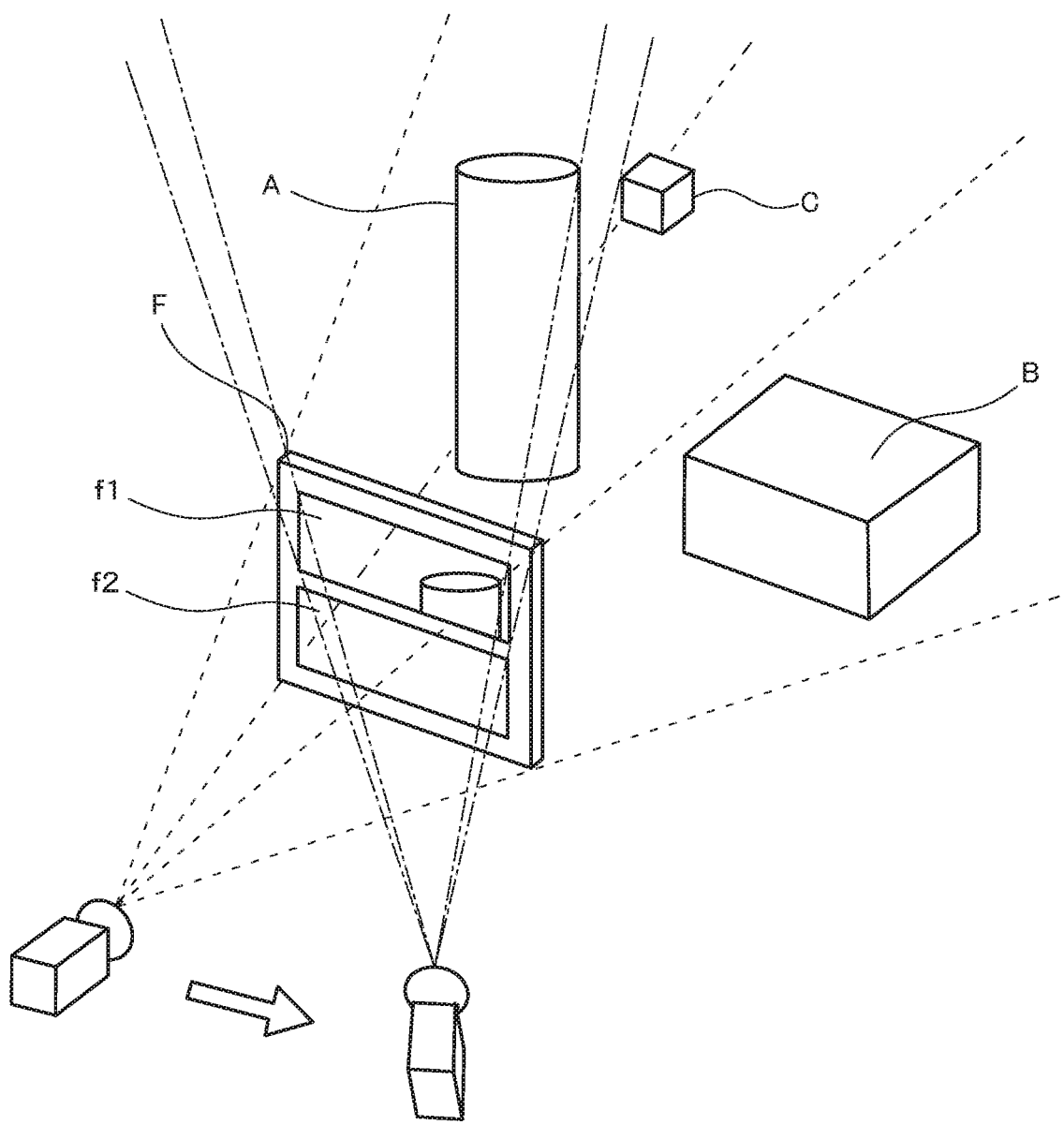
FIG. 17 is an explanatory drawing for explaining a state where photographing viewpoints are changed corresponding to at least one of the embodiments of the present invention.

FIG. 17 is an explanatory drawing for explaining a state where photographing viewpoints are changed. In a case where posture information such as a photographing direction, a photographing angle, or a moving direction of the terminal device 20 is changed and a relative positional relationship between the terminal device 20 and the display frame F is changed from an initial position thereof, rendering is executed by using a direction of the photographing viewpoint of the terminal device 20 after change as a direction of the virtual viewpoint. FIG. 17 illustrates a state where the virtual viewpoints are changed with the change in the photographing viewpoint of the terminal device 20. As illustrated in FIG. 17, in a case where the virtual viewpoints are changed, a three-dimensional virtual object that exists behind the display areas f1 and f2 of the display frame F at the initial position from a position of the virtual viewpoint after change is rendered. At this time, since a positional relationship between the display frame F and the three-dimensional virtual objects A, B, and C is fixed, the content of the rendering is also changed by changing the virtual viewpoints with respect to the display areas f1 and f2 of the display frame F. The rendering content is appropriately revised in this manner so as to follow the changed virtual viewpoint, and the three-dimensional virtual object is displayed. Therefore, it becomes possible for the user to feel an augmented reality space that expands in the display areas f1 and f2 more realistically by looking into the display areas f1 and f2 while changing an angle with respect to the display frame F.

FIG. 18 is an explanatory drawing illustrating one example of a display screen that a terminal device is caused to display. FIG. 18A is an explanatory drawing illustrating a state where a photographed image is displayed on a display screen. A chair is viewed in FIG. 18A. For example, a predetermined condition for displaying a display frame, such as a condition that an AR marker for displaying a display frame on the chair is provided and the terminal device 20 recognizes the AR marker or a condition that the chair as an object is specified from a three-dimensional shape of the chair itself, is set. When such a predetermined condition is satisfied, as illustrated in FIG. 18B, an image obtained by superimposing and displaying a display frame F on the chair in the photographed image is displayed on the display screen.

As explained above, as one side of the fifth embodiment, the image processing apparatus 20E provided with the photographing unit and the display unit includes the photographed image obtaining unit 21, the display frame displaying unit 22E, the posture information obtaining unit 26, the initial position information storing unit 27, the virtual space information obtaining unit 23, the rendering unit 24E, and the storing unit 25. Thus, the initial position information storing unit 27 at least stores, the initial position, the relative positional relationship between the position of the terminal device 20E when the display frame is first displayed and the position of the terminal device 20E in a case where the display frame is assumed to exist in a real space; the display frame displaying unit 22E displays, in a case where the relative positional relationship between the terminal device 20E and the display frame or the photographing viewpoint is changed by changing the posture state of the terminal device, the display frame positioned at the initial position from the photographing viewpoint after change; and the rendering unit 24E executes rendering on the basis of the virtual viewpoint that is substantially the same viewpoint as the photographing viewpoint after change. Therefore, it becomes possible to display the three-dimensional virtual object corresponding to the photographing viewpoint after change in the display area of the display frame. Further, at this time, it becomes possible to change the display content in addition to an arrangement condition of the three-dimensional virtual objects in the virtual space by using the filter set to the display area and the temporary erasure setting to adjust the three-dimensional virtual object as the rendering target. This makes it possible to a degree of freedom for arrangement of the three-dimensional virtual object in the virtual space.

Namely, a positional relationship between the display frame and the three-dimensional virtual object in the virtual space is fixed in a state that the positional relationship is set in advance. However, when the positional relationship between the terminal device 20E and the display frame or the photographing angle is changed, appearance of the three-dimensional virtual object arranged behind the display frame in the virtual space is changed by rendering the three-dimensional virtual object arranged behind the display area when viewed from the photographing viewpoint after change. Therefore, in a case where the display frame superimposed and displayed onto the photographed image of the terminal device 20E is observed while changing an angle with respect to the display frame by using an AR technique when viewed from the user, the three-dimensional virtual object rendered in the display area of the display frame is changed. This makes it possible to display such an image that the user looks into a virtual space provided behind the display area by using the display area as a window frame. Further, a degree of freedom for arrangement can be improved and this makes it possible to execute a display that attracts the interest of the user by, for example, arranging a three-dimensional object at a position at which the three-dimensional object can be seen only when an angle is changed.

In this regard, the image processing apparatus that has been explained in each of the first to fifth embodiments described above can utilize the display frame to be displayed for various types of displays. For example, it is possible to utilize the display frame to express comics by the AR technique. By dealing with the display frame as a page of comics and dealing with the display areas as respective frames of the comics, it becomes possible to superimpose and display the page of the comics onto the photographed image obtained by photographing the real space. It is not necessary to express all of frames among a plurality of frames constituting a page of comics by using images obtained by rendering a virtual space as the display areas according to the present embodiment, and it is also possible to create comics that include both frames in which comics drawn by a comics drawing staff are displayed and frames as display areas in which images obtained by rendering a virtual space are displayed. Further, it is also possible to arrange a picture drawn by the comics drawing staff in the virtual space as a plate-like three-dimensional virtual object. It also becomes possible to express that a character constructed by 3D polygons is arranged in the virtual space as a three-dimensional virtual object by using a background obtained by putting a picture drawn by the comics drawing staff on a surface of a plate-like polygon.

Even if a plurality of display areas are provided in one page of comics during processing of a display frame as a page of comics, a processing load can be prevented from increasing regardless of an increase in the number of frames because a method of rendering the three-dimensional virtual object at one time on the basis of one virtual viewpoint is adopted. Further, by utilizing the filter or the temporary erasure setting, it becomes possible to show that each of the display areas has an independent three-dimensional virtual space regardless of the method of rendering the three-dimensional virtual object at one time on the basis of one virtual viewpoint.

In this regard, in each of the first to fifth embodiments described above, the configuration in which the display frame is superimposed and displayed onto the photographed image obtained by photographing the real space, that is, the case of realizing it as the AR technique has been explained as an example. However, the present invention is not limited to the AR technique. For example, a display frame may be arranged in a virtual space that is provided by a virtual reality (VR) technique using a head mount display or the like, and the rendering process that has been explained in each of the first to fifth embodiments described above may be executed for each of display areas of the display frame. Further, in a case where video to be displayed on a display of a terminal device is video in which a three-dimensional virtual space is expressed, a display frame may be arranged in a three-dimensional virtual space, and the rendering process that has been explained in each of the first to fifth embodiments described above may be executed for each of display areas of the display frame.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of terminal devices 20, and 201 to 20n and the server apparatus 10 executes the various kinds of processing described above in accordance with various kinds of control programs (for example, an image processing program) stored in the storage device with which the corresponding terminal or server is provided.

Further, the configuration of the image processing system is not limited to the configuration that has been described in each of the embodiments described above as examples. For example, the image processing system may be configured so that the server apparatus 10 executes a part or all of the processes that have been explained as the processes executed by each of the plurality of terminal devices 20, and 201 to 20n. Alternatively, the image processing system may be configured so that any of the plurality of terminal devices 20, and 201 to 20n (for example, the terminal device 20) executes a part or all of the processes that have been explained as the processes executed by the server apparatus 10. Further, the image processing system may be configured so that a part or all of the storage unit included in the server apparatus 10 is included in any of the plurality of terminal devices 20, and 201 to 20n. Namely, the image processing system may be configured so that a part or all of the functions of any one of the terminal device 20 and the server apparatus 10 according to the system is included in the other.

Further, the system 100 may be configured so that the program causes a single apparatus to perform a part or all of the functions that have been explained as the example of each of the embodiments described above without including any communication network.

APPENDIX

The explanation of the embodiments described above has been described so that the following inventions can be at least performed by a person having a normal skill in the art to which the present invention belongs.

(1)

A non-transitory computer-readable medium including an image processing program for causing a terminal device provided with a photographing unit and a display unit to perform functions to cause the display unit to display a display screen, the display screen being obtained by superimposing and displaying a virtual object onto a photographed image, the virtual object being arranged in a virtual space, the photographed image being obtained by photographing a real space by means of the photographing unit, the functions comprising:

a photographed image obtaining function configured to obtain a photographed image, the photographed image being obtained by photographing a real space by means of the photographing unit;

a display frame displaying function configured to display a display frame in a display area of the photographed image in a case where a predetermined condition is satisfied, the display frame being one of virtual objects and having one or more display areas;

a virtual space information obtaining function configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and a rendering function configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering function being configured to display the certain three-dimensional virtual object in the display area of the display frame.

(2)

The non-transitory computer-readable medium according to (1), wherein identification IDs are respectively associated with the three-dimensional virtual objects, wherein a filter can be set to the display area, any of the identification IDs being able to be associated with the filter, and wherein the rendering function is configured to specify, on a basis of the filter set to the display area, the three-dimensional virtual object to be displayed, and execute rendering to display the three-dimensional virtual object in the display area.

(3)

The non-transitory computer-readable medium according to (1) or (2), wherein the functions further include:

a posture information obtaining function configured to obtain posture information, the posture information containing at least one of a photographing direction, a photographing angle, or a moving direction specified on the basis of information from various kinds of sensors included in the terminal device; and an initial position information storing function configured to at least store, as an initial position, a relative positional relationship between a position of the terminal device when the display frame is first displayed by the display frame displaying function and a position of the terminal device in a case where the display frame is assumed to exist in the real space, wherein the display frame displaying function is further configured to display, in a case where a relative positional relationship between the terminal device and the display frame or the photographing viewpoint is changed by changing a posture state of the terminal device, the display frame positioned at the initial position from the photographing viewpoint after change, and wherein the rendering function is further configured to render the certain three-dimensional virtual object on a basis of the virtual viewpoint that is substantially the same viewpoint as the photographing viewpoint after change.

(4)

The non-transitory computer-readable medium according to any one of (1) to (3), wherein identification IDs are respectively associated with the three-dimensional virtual objects, wherein a temporary erasure setting can be set to the three-dimensional virtual object, the temporary erasure setting being used for setting a state where a three-dimensional virtual object with a designated identification ID is temporarily erased and the rendering is then executed, and wherein the rendering function is further configured to erase the three-dimensional virtual object designated to be temporarily erased by the temporary erasure setting, render the certain three-dimensional virtual object, and display the rendered three-dimensional virtual object in the display area.

(5)

The non-transitory computer-readable medium according to (4), wherein the functions further include:

a display determining function configured to determine whether any display area of the one or more display areas is contained in the display screen or not in a case where the display areas of the display frame on the display screen are changed, and wherein the rendering function is further configured to set the temporary erasure setting to be effective and execute the rendering only in a case where the display area in which the three-dimensional virtual object as an erasure target in the temporary erasure setting is set to be displayed does not exist in the display area that is determined to be contained in the display screen by the display determining function.

(6)

A non-transitory computer-readable medium including an image processing program for causing a server apparatus to perform at least one function of the functions that the image processing program described in any one of (1) to (5) causes the terminal device to perform, the server apparatus being capable of communicating with the terminal device.

(7)

A terminal device into which the image processing program described in any one of (1) to (6) is installed.

(8)

A non-transitory computer-readable medium including an image processing program for causing a server apparatus to perform functions to display a display screen, the display screen being obtained by superimposing and displaying a virtual object onto a photographed image, the virtual object being arranged in a virtual space, the photographed image being obtained by photographing a real space, the functions comprising:

a photographed image obtaining function configured to obtain a photographed image, the photographed image being obtained by photographing a real space by means of a photographing unit;

a display frame displaying function configured to display a display frame in a display area of the photographed image in a case where a predetermined condition is satisfied, the display frame being one of virtual objects and having one or more display areas;

a virtual space information obtaining function configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and a rendering function configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering function being configured to display the certain three-dimensional virtual object in the display area of the display frame.

(9)

A non-transitory computer-readable medium including an image processing program for causing a terminal device to perform at least one function of the functions that the image processing program described in (8) causes the server apparatus to perform, the terminal device being capable of communicating with the server apparatus.

(10)

A server apparatus into which the image processing program described in (8) or (9) is installed.

(11)

An image processing system or causing a terminal device to display a display screen, the image processing system comprising a communication network, a server apparatus, and a terminal device, the display screen being obtained by superimposing and displaying a virtual object onto a photographed image, the virtual object being arranged in a virtual space, the photographed image being obtained by photographing a real space, the image processing system comprising:

a photographed image obtaining unit configured to obtain a photographed image, the photographed image being obtained by photographing a real space by means of a photographing unit;

a display frame displaying unit configured to display a display frame in a display area of the photographed image in a case where a predetermined condition is satisfied, the display frame being one of virtual objects and having one or more display areas;

a virtual space information obtaining unit configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and a rendering unit configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering unit being configured to display the certain three-dimensional virtual object in the display area of the display frame.

(12)

An image processing apparatus provided with a photographing unit and a display unit, the image processing apparatus comprising:

a photographed image obtaining unit configured to obtain a photographed image, the photographed image being obtained by photographing a real space by means of the photographing unit;

a display frame displaying unit configured to display a display frame in a display area of the photographed image in a case where a predetermined condition is satisfied, the display frame being one of virtual objects and having one or more display areas;

a virtual space information obtaining unit configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and a rendering unit configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering unit being configured to display the certain three-dimensional virtual object in the display area of the display frame.

(13)

An image processing method of causing a terminal device provided with a photographing unit and a display unit to display a display screen by the display unit, the display screen being obtained by superimposing and displaying a virtual object onto a photographed image, the virtual object being arranged in a virtual space, the photographed image being obtained by photographing a real space by means of the photographing unit, the image processing method comprising:

a photographed image obtaining process configured to obtain a photographed image, the photographed image being obtained by photographing a real space by means of the photographing unit;

a display frame displaying process configured to display a display frame in a display area of the photographed image in a case where a predetermined condition is satisfied, the display frame being one of virtual objects and having one or more display areas;

a virtual space information obtaining process configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and a rendering process configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering process being configured to display the certain three-dimensional virtual object in the display area of the display frame.

(14)

An image processing method executed by an image processing system to cause a display unit to display a display screen, the image processing system including a communication network, a server apparatus, and a terminal device, the display screen being obtained by superimposing and displaying a virtual object onto a photographed image, the virtual object being arranged in a virtual space, the photographed image being obtained by photographing a real space, the image processing method comprising:

a photographed image obtaining process configured to obtain a photographed image, the photographed image being obtained by photographing a real space by means of the photographing unit;

a display frame displaying process configured to display a display frame in a display area of the photographed image in a case where a predetermined condition is satisfied, the display frame being one of virtual objects and having one or more display areas;

a virtual space information obtaining process configured to obtain virtual space information, the virtual space information at least containing three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and a rendering process configured to render a certain three-dimensional virtual object in a case where the display frame in the virtual space is virtually photographed from a virtual viewpoint, the certain three-dimensional virtual object being viewed behind the display area when the display frame is photographed from the virtual viewpoint by assuming that a display area of the display frame is a transmission area, the virtual viewpoint being substantially the same viewpoint as a photographing viewpoint of the photographing unit, the rendering process being configured to display the certain three-dimensional virtual object in the display area of the display frame.

What is claimed is:

1. A non-transitory computer-readable medium including an image processing program for causing a terminal device comprising a photographing unit and a display unit to perform functions to cause the display unit to display a display screen, the functions comprising:
- a photographed image obtaining function configured to obtain a photographed image, the photographed image being obtained by photographing a real space by the photographing unit;
- a display frame displaying function configured to display a display frame in a display area of the photographed image in a case where a predetermined condition is satisfied, the display frame being one of virtual objects and having one or more display areas;
- a virtual space information obtaining function configured to obtain virtual space information comprising three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and
- a rendering function configured to render a three-dimensional virtual object in a case where the display frame in the virtual space is virtually photographed from a virtual viewpoint, the three-dimensional virtual object being viewed behind the display area when the display frame is photographed from the virtual viewpoint by assuming that the display area of the display frame is a transmission area, the virtual viewpoint being substantially the same viewpoint as a photographing viewpoint of the photographing unit, the rendering function being configured to display the three-dimensional virtual object in the display area of the display frame.

2. The non-transitory computer-readable medium according to claim 1,
wherein identifiers are respectively associated with the three-dimensional virtual objects,
wherein a filter is configured to be set to the display area, any of the identifiers being able to be associated with the filter, and
wherein the rendering function is configured to specify, on a basis of the filter set to the display area, the three-dimensional virtual object to be displayed, and to execute rendering to display the three-dimensional virtual object in the display area.

3. The non-transitory computer-readable medium according to claim 1,
wherein the functions further include:
a posture information obtaining function configured to obtain posture information, the posture information containing at least one of a photographing direction, a photographing angle, or a moving direction specified on the basis of information from various kinds of sensors included in the terminal device; and
an initial position information storing function configured to at least store, as an initial position, a relative positional relationship between a position of the terminal device when the display frame is first displayed by the display frame displaying function and a position of the terminal device in a case where the display frame is assumed to exist in the real space,
wherein the display frame displaying function is further configured to display, in a case where a relative positional relationship between the terminal device and the display frame or the photographing viewpoint is changed by changing a posture state of the terminal device, the display frame positioned at the initial position from the photographing viewpoint after change, and
wherein the rendering function is further configured to render the three-dimensional virtual object on a basis of the virtual viewpoint that is substantially the same viewpoint as the photographing viewpoint after change.

4. The non-transitory computer-readable medium according to claim 1,
wherein identifiers are respectively associated with the three-dimensional virtual objects,
wherein a temporary erasure setting can be set to the three-dimensional virtual object, the temporary erasure setting being used for setting a state where a three-dimensional virtual object with a designated identifier is temporarily erased and the rendering is then executed, and
wherein the rendering function is further configured to erase the three-dimensional virtual object designated to be temporarily erased by the temporary erasure setting, render the three-dimensional virtual object, and display the rendered three-dimensional virtual object in the display area.

5. The non-transitory computer-readable medium according to claim 4,
wherein the functions further include:
a display determining function configured to determine whether a second display area of the one or more display areas is contained in the display screen or not in a case where the display areas of the display frame on the display screen are changed, and
wherein the rendering function is further configured to set the temporary erasure setting to be effective and execute the rendering only in a case where the display area in which the three-dimensional virtual object as an erasure target in the temporary erasure setting is set to be displayed does not exist in the second display area that is determined to be contained in the display screen by the display determining function.

6. An image processing apparatus comprising a photographing unit and a display unit, the image processing apparatus comprising:
- a photographed image obtaining unit configured to obtain a photographed image by photographing a real space by the photographing unit;
- a display frame displaying unit configured to display a display frame in a display area of the photographed image in a case where a predetermined condition is satisfied, the display frame being one of virtual objects and having one or more display areas;
- a virtual space information obtaining unit configured to obtain virtual space information comprising three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and a rendering unit configured to render a three-dimensional virtual object in a case where the display frame in the virtual space is virtually photographed from a virtual viewpoint, the three-dimensional virtual object being viewed behind the display area when the display frame is photographed from the virtual viewpoint by assuming that the display area of the display frame is a transmission area, the virtual viewpoint being substantially the same viewpoint as a photographing viewpoint of the photographing unit, the rendering unit being configured to display the three-dimensional virtual object in the display area of the display frame.

7. An image processing method of causing a terminal device comprising a photographing unit and a display unit to display a display screen by the display unit, the image processing method comprising:

obtaining a photographed image by photographing a real space by the photographing unit;

displaying a display frame in a display area of the photographed image in a case where a predetermined condition is satisfied, the display frame being one of virtual objects and having one or more display areas;

obtaining virtual space information comprising three-dimensional virtual object information and positional relationship information, the three-dimensional virtual object information regarding one or more three-dimensional virtual objects arranged in a virtual space in advance, the positional relationship information regarding a positional relationship between each of the one or more three-dimensional virtual objects and the display frame; and rendering a three-dimensional virtual object in a case where the display frame in the virtual space is virtually photographed from a virtual viewpoint, the three-dimensional virtual object being viewed behind the display area when the display frame is photographed from the virtual viewpoint by assuming that the display area of the display frame is a transmission area, the virtual viewpoint being substantially the same viewpoint as a photographing viewpoint of the photographing unit, and displaying the three-dimensional virtual object in the display area of the display frame.

* * * * *